(12) United States Patent
Naoi et al.

(10) Patent No.: US 12,068,473 B2
(45) Date of Patent: Aug. 20, 2024

(54) SYSTEM FOR MANUFACTURING AN ELECTRODE, CLEANING UNIT, AND ELECTRODE MANUFACTURING METHOD

(71) Applicant: MUSASHI ENERGY SOLUTIONS CO., LTD., Hokuto (JP)

(72) Inventors: Masaya Naoi, Minato-ku (JP); Kazunari Aita, Minato-ku (JP)

(73) Assignee: MUSASHI ENERGY SOLUTIONS CO., LTD., Hokuto (JP)

( * ) Notice: Subject to any disclaimer, the term of this patent is extended or adjusted under 35 U.S.C. 154(b) by 48 days.

(21) Appl. No.: 17/432,142

(22) PCT Filed: Dec. 26, 2019

(86) PCT No.: PCT/JP2019/051291
§ 371 (c)(1),
(2) Date: Aug. 19, 2021

(87) PCT Pub. No.: WO2020/170607
PCT Pub. Date: Aug. 27, 2020

(65) Prior Publication Data
US 2022/0158156 A1 May 19, 2022

(30) Foreign Application Priority Data
Feb. 20, 2019 (JP) ................................ 2019-028605

(51) Int. Cl.
*H01M 4/04* (2006.01)
*H01G 11/50* (2013.01)
(Continued)

(52) U.S. Cl.
CPC ............ *H01M 4/049* (2013.01); *H01G 11/50* (2013.01); *H01G 11/86* (2013.01); *H01G 13/02* (2013.01); *H01M 4/139* (2013.01)

(58) Field of Classification Search
None
See application file for complete search history.

(56) References Cited

U.S. PATENT DOCUMENTS

| 5,010,819 A | * | 4/1991 | Uribe | ............... | B41F 35/06 |
| | | | | | 101/423 |
| 2002/0153025 A1 | * | 10/2002 | Yoshimura | ............. | B08B 1/04 |
| | | | | | 15/103.5 |

(Continued)

FOREIGN PATENT DOCUMENTS

| CN | 108701553 A | 10/2018 |
| CN | 108889643 A | 11/2018 |

(Continued)

OTHER PUBLICATIONS

WO2017146223A1—Google Patents (Year: 2017).*

(Continued)

*Primary Examiner* — Charles Capozzi
(74) *Attorney, Agent, or Firm* — Oblon, McClelland, Maier & Neustadt, L.L.P.

(57) ABSTRACT

An electrode manufacturing system includes: a doping unit; a cleaning unit: and a conveyor unit. The doping unit performs a process of doping an active material in a strip-shaped electrode with an alkali metal, the strip-shaped electrode including an active material layer formed portion in which an active material layer including the active material is formed, and an active material layer unformed portion in which the active material layer is not formed. The cleaning unit cleans the active material layer unformed portion that is adjacent to the active material layer formed portion. The conveyor unit conveys the electrode from the doping unit to the cleaning unit.

11 Claims, 10 Drawing Sheets

(51) Int. Cl.
*H01G 11/86* (2013.01)
*H01G 13/02* (2006.01)
*H01M 4/139* (2010.01)

(56) References Cited

U.S. PATENT DOCUMENTS

| | | | |
|---|---|---|---|
| 2014/0075690 A1* | 3/2014 | Lee | B08B 3/041 15/77 |
| 2017/0151586 A1* | 6/2017 | Yanagisawa | B08B 1/02 |
| 2019/0074143 A1* | 3/2019 | Naoi | H01M 4/139 |

FOREIGN PATENT DOCUMENTS

| | | | |
|---|---|---|---|
| EP | 3 422 377 A1 | 1/2019 | |
| JP | 10-308212 A | 11/1998 | |
| JP | 2005-123175 A | 5/2005 | |
| JP | 2006-107795 A | 4/2006 | |
| JP | 2008-77963 A | 4/2008 | |
| JP | 2009-246137 A | 10/2009 | |
| JP | 2012-49543 A | 3/2012 | |
| JP | 2012-49544 A | 3/2012 | |
| JP | 2013-258392 A | 12/2013 | |
| KR | 20030041558 A | 5/2003 | |
| WO | WO2017146223 A1 * | 8/2017 | H01G 11/06 |

OTHER PUBLICATIONS

English translation for KR20030041558.*
Extended European Search Report issued on Dec. 20, 2022 in European Patent Application No. 19916167.0, citing references 15 and 16 therein, 9 pages.
Combined Chinese Office Action and Search Report issued on Jun. 9, 2023 in Chinese Patent Application No. 201980092557.3 (with English translation), citing reference 15 therein, 16 pages.
Office Action dated on Jan. 9, 2024 in the corresponding Chinese Patent Application No. 201980092557.3 (with machine-generated English translation), citing document 15, therein.

* cited by examiner

SYSTEM FOR MANUFACTURING AN ELECTRODE, CLEANING UNIT, AND ELECTRODE MANUFACTURING METHOD

CROSS-REFERENCE TO RELATED APPLICATIONS

This international application claims the benefit of Japanese Patent Application No. 2019-28605 filed on Feb. 20, 2019 with the Japan Patent Office and the entire disclosure of Japanese Patent Application No. 2019-28605 is incorporated in the present international application by reference.

TECHNICAL FIELD

The present disclosure relates to an electrode manufacturing system, a cleaning unit, and an electrode manufacturing method.

BACKGROUND ART

Reduction in size and weight of electronic devices has been remarkable in recent years, and there has been accordingly an increased demand for reduction in size and weight of power storage devices used as power supplies for driving such electronic devices.

Nonaqueous electrolyte rechargeable batteries, as typified by a lithium-ion rechargeable battery, have been developed as power storage devices meeting such a demand for reduction in size and weight. There have been known lithium-ion capacitors as power storage devices to cope with applications requiring high energy density characteristics and high output characteristics. Further known are sodium ion batteries and capacitors using sodium which is lower in cost and more abundant as a natural resource than lithium.

For these batteries and capacitors, a process of previously doping an electrode with an alkali metal (generally referred to as a pre-doping) is adopted for various purposes. Methods for pre-doping an electrode with the alkali metal include, for example, a continuous method. In the continuous method, pre-doping is performed while the strip-shaped electrode is transferred in a dope solution. The continuous method is disclosed in Patent Documents 1 to 4.

PRIOR ART DOCUMENTS

Patent Documents

Patent Document 1: Japanese Unexamined Patent Application Publication No. H10-308212
Patent Document 2: Japanese Unexamined Patent Application Publication No. 2008-77963
Patent Document 3: Japanese Unexamined Patent Application Publication No. 2012-49543
Patent Document 4: Japanese Unexamined Patent Application Publication No. 2012-49544

SUMMARY OF THE INVENTION

Problems to be Solved by the Invention

The strip-shaped electrode comprises a current collector and an active material layer. There is a case where a part of a surface of the current collector is made as an active material layer unformed portion. The active material layer unformed portion is a portion where the active material layer is not formed. When the pre-doping is performed, the dope solution adheres to the active material layer unformed portion, too. It is preferable to remove a residue of the dope solution adhering to the active material layer unformed portion because it adversely affects welding between a current collector tab of a battery and the active material layer unformed portion.

In one aspect of the present disclosure, it is preferable to provide an electrode manufacturing system, a cleaning unit, and an electrode manufacturing method that can clean the active material layer unformed portion.

Means for Solving the Problems

One aspect of the present disclosure provides an electrode manufacturing system that comprises: a doping unit configured to perform a process of doping an active material in a strip-shaped electrode with an alkali metal, the strip-shaped electrode including an active material layer formed portion in which an active material layer including the active material is formed on a surface of a current collector, and an active material layer unformed portion in which the active material layer is not formed on the surface of the current collector; a cleaning unit configured to clean the active material layer unformed portion that is adjacent to the active material layer formed portion having been subjected to the process; and a conveyor unit configured to convey the electrode from the doping unit to the cleaning unit.

The electrode manufacturing system according to the one aspect of the present disclosure can clean the active material layer unformed portion by using the cleaning unit.

Another aspect of the present disclosure provides a cleaning unit for cleaning a strip-shaped electrode including an active material layer formed portion in which an active material layer including an active material is formed on a surface of a current collector, and an active material layer unformed portion in which the active material layer is not formed on the surface of the current collector, the cleaning unit configured to clean the active material layer unformed portion that is adjacent to the active material layer formed portion having been subjected to a process of doping the active material with an alkali metal.

The cleaning unit according to the another aspect of the present disclosure can clean the active material layer unformed portion.

Another aspect of the present disclosure provides an electrode manufacturing method comprising: performing a process of doping an active material in a strip-shaped electrode with an alkali metal, the strip-shaped electrode including an active material layer formed portion in which an active material layer including the active material is formed on a surface of a current collector, and an active material layer unformed portion in which the active material layer is not formed on the surface of the current collector; conveying the electrode having been subjected to the process; and cleaning the active material layer unformed portion that is adjacent to the active material layer formed portion having been subjected to the process.

According to the electrode manufacturing method of the another aspect of the present disclosure, the active material layer unformed portion can be cleaned.

EXPLANATION OF REFERENCE NUMERALS

1 . . . electrode; 3 . . . current collector; 5 . . . active material layer; 6 . . . active material layer formed portion; 7 . . . active material layer unformed portion; 11 . . . electrode manufacturing system; 15 . . . electrolyte solution treatment bath; 17, 19, 21 . . . doping bath; 23 . . . cleaning bath; 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 . . . conveyor roller; 101 . . . supply roll; 103 . . . winding roll; 105 . . . support; 107 . . . circulation filtration unit; 109, 110, 111, 112, 113, 114 . . . power supply; 117 . . . tab cleaner; 119 . . . recovery unit; 121 . . . end portion sensor; 131 . . . upstream bath; 133 . . . downstream bath; 137, 139, 141, 143 . . . counter electrode unit; 149, 151 . . . space; 153 . . . conductive base material; 155 . . . alkali metal-containing plate; 157 . . . porous insulating member; 161 . . . filter; 163 . . . pump; 165 . . . pipe; 201, 203 . . . cleaning roller unit; 205 . . . cleaning liquid tank; 207 . . . pump; 209 . . . dryer unit; 211 . . . first portion; 213 . . . second portion; 215 . . . support plate; 217 . . . brush roller; 219 . . . cleaning tank; 221 . . . motor; 223, 225, 231 . . . pulley; 227 . . . shaft; 229 . . . bearing; 233 . . . belt; 235 . . . pipe; 237 . . . blow nozzle; 239 . . . control system; 241 . . . end position adjuster unit; 243 . . . roll driving unit; 245, 249 . . . gear; 247 . . . compact motor; 248 . . . overflow pipe; 250 . . . waste liquid tank; 301 . . . cleaning roller unit; 311 . . . first portion; 313 . . . second portion; 315 . . . brush arm; 317 . . . supporting shaft; 318 . . . fixed portion; 319 . . . brush shaft; 321 . . . motor; 323 . . . greaseless bearing; 325 . . . main body; 327 . . . first projection; 329 . . . second projection; 331 . . . third projection; 333 . . . fourth projection; 335 . . . fixing screw

MODE FOR CARRYING OUT THE INVENTION

Example embodiments of the present disclosure will be described with reference to the drawings.

First Embodiment

1. Configuration of Electrode 1

Figure 1:
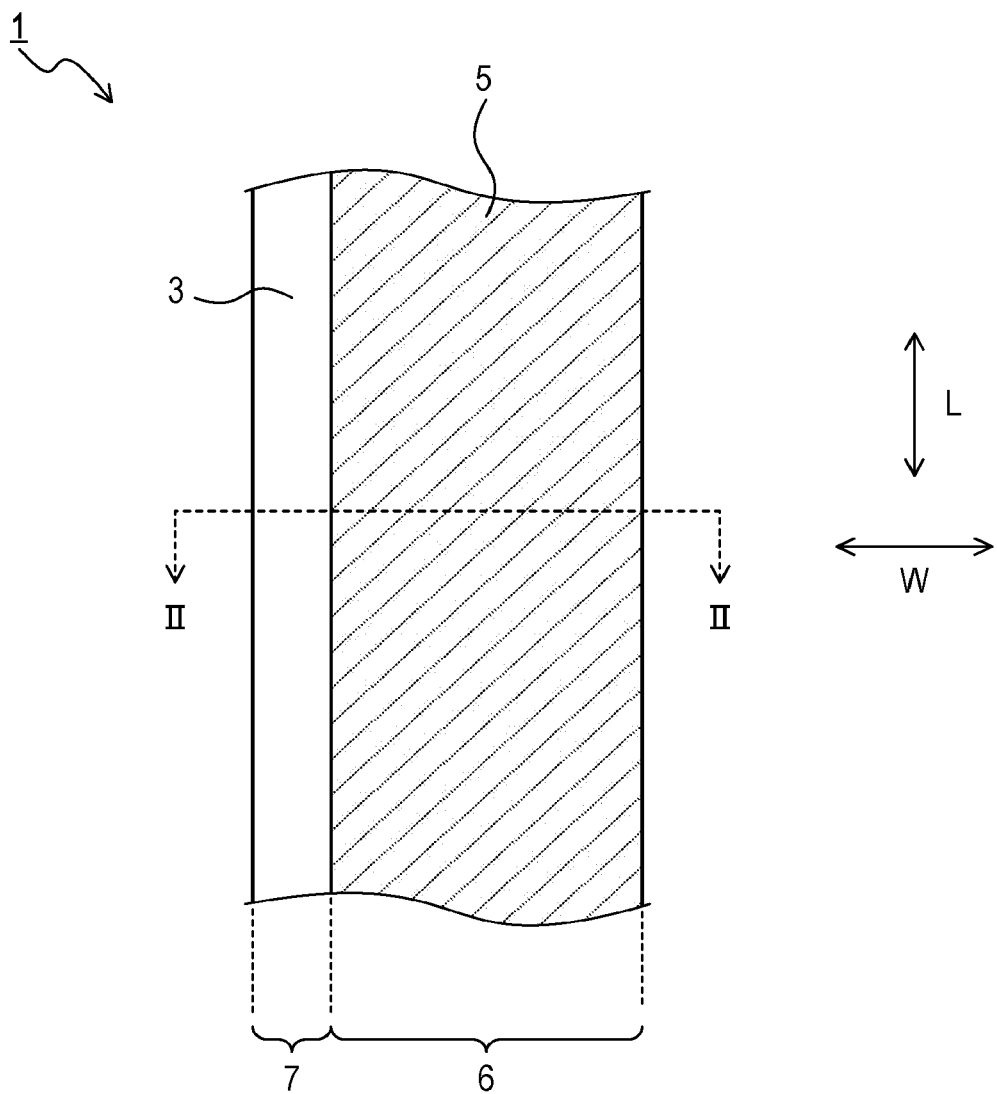
FIG. 1 is a plan view showing a configuration of an electrode.
Figure 2:
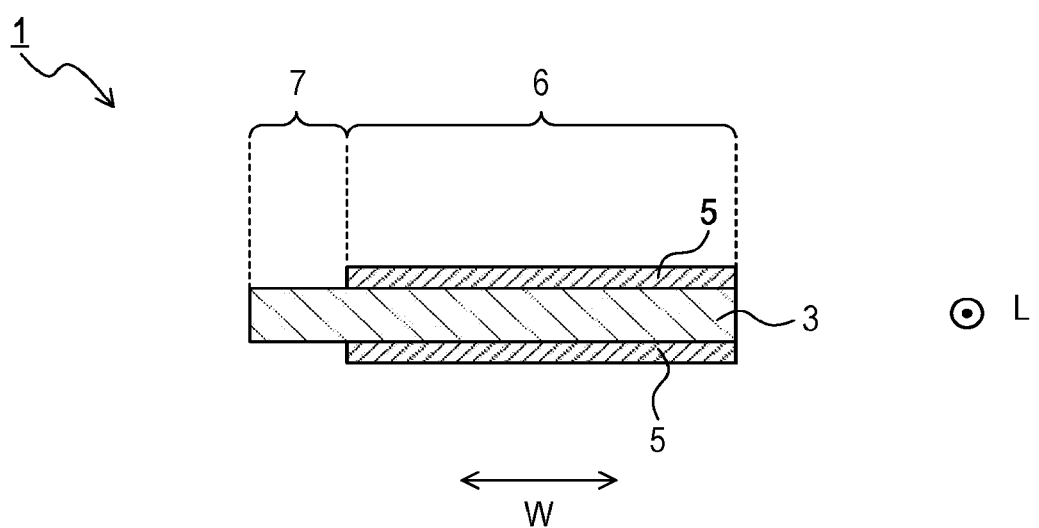
FIG. 2 is a sectional view taken along a cross-section II-II in FIG. 1.

Descriptions will be given of a configuration of an electrode 1 with reference to FIG. 1 and FIG. 2. The electrode 1 has a strip-like shape. The electrode 1 comprises a current collector 3 and active material layers 5. The current collector 3 has a strip-like shape. The active material layers 5 are formed on both sides of the current collector 3 respectively.

There are an active material layer formed portion 6 and an active material layer unformed portion 7 on a surface of the electrode 1. The active material layer formed portion 6 is a portion where an active material layer 5 is formed on a surface of the current collector 3. The active material layer unformed portion 7 is a portion where the active material layer 5 is not formed on the surface of the current collector 3. The current collector 3 is exposed at the active material layer unformed portion 7.

The active material layer unformed portion 7 has a strip-like shape extending along a longitudinal direction L of the electrode 1. The active material layer unformed portion 7 is situated at an end of the electrode 1 in a width direction W of the electrode 1.

It is preferable that the current collector 3 is a metal foil of, for example, copper, nickel, stainless steel or the like. The current collector 3 may comprise a conductive layer, which mainly comprises a carbon material, formed on the metal foil. A thickness of the current collector 3 is, for example, 5 to 50 μm.

The active material layer 5 can be prepared by applying a slurry containing, for example, an active material, a binder, and the like onto the current collector 3 and drying the slurry.

Examples of the binder include a rubber-based binder, such as styrene-butadiene rubber (SBR) or NBR; a fluorine resin, such as polytetrafluoroethylene, or polyvinylidene fluoride; polypropylene, polyethylene, and a fluorine modified (meth) acrylic binder, as disclosed in Japanese Unexamined Patent Application Publication No. 2009-246137.

The slurry may contain other components in addition to the active material and the binder. Examples of the other components include conductive agents, such as carbon black, graphite, vapor-grown carbon fiber, and metal particles; and thickening agents, such as carboxymethyl cellulose, sodium salt or ammonium salt thereof, methyl cellulose, hydroxymethyl cellulose, ethyl cellulose, hydroxypropyl cellulose, polyvinyl alcohol, oxidized starch, phosphorylated starch, and casein.

A thickness of the active material layer 5 is not particularly limited. The thickness of the active material layer 5 ranges, for example, from 5 to 500 μm, preferably from 10 to 200 μm, or more preferably from 10 to 100 μm. The active material contained in the active material layer 5 can be any electrode active materials applicable to a cell or a capacitor that uses insertion/desorption of alkali metal ions. The active material may be a negative electrode active material or a positive electrode active material.

The negative electrode active material is not limited to a particular material. Examples of the negative electrode active material include carbon materials, such as graphite, easily graphitizable carbon, hardly graphitized carbon, or a composite carbon material composed of graphite particles coated with a carbide of a pitch or resin; and materials containing metals or semimetals that can be alloyed with lithium, such as Si and Sn, or the oxides thereof. A specific example of the carbon material is the carbon material described in Japanese Unexamined Patent Application Publication No. 2013-258392. Specific examples of materials containing metals or semimetals that can be alloyed with lithium or oxides thereof are the materials described in Japanese Unexamined Patent Application Publication Nos. 2005-123175 and 2006-107795.

Examples of the positive electrode active material include transition metal oxides, such as cobalt oxide, nickel oxide, manganese oxide, and vanadium oxide; and sulfur active materials, such as elemental sulfur and metal sulfide. The positive electrode active material and the negative electrode active material may each be composed of a single substance or a mixture of two or more substances.

The active material contained in the active material layer 5 is pre-doped with an alkali metal by using an electrode manufacturing system 11, which will be described later. The alkali metal for pre-doping the active material is preferably lithium or sodium, especially lithium. In a case where the electrode 1 is used for production of electrodes of lithium-ion rechargeable batteries, a density of the active material layer 5 is preferably 1.30 to 2.00 g/cc, especially 1.40 to 1.90 glee.

2. Configuration of Electrode Manufacturing System 11

Figure 3:
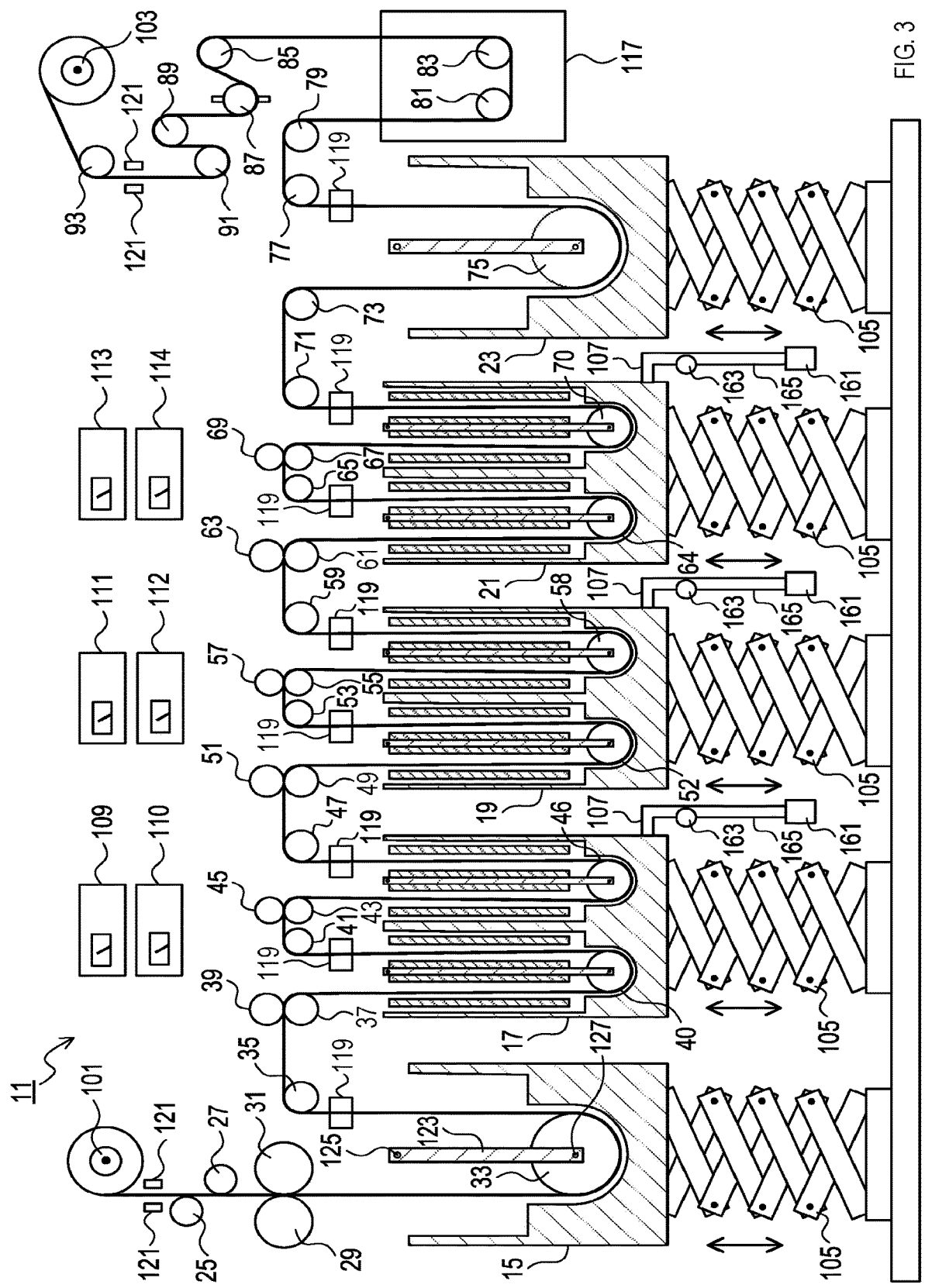
FIG. 3 is an explanatory diagram showing a configuration of an electrode manufacturing system.

Descriptions will be given of a configuration of the electrode manufacturing system 11 with reference to FIG. 3 to FIG. 5. As shown in FIG. 3, the electrode manufacturing system 11 includes an electrolyte solution treatment bath 15, doping baths 17, 19, 21, a cleaning bath 23, conveyor rollers 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 (hereinafter also collectively referred to as a "conveyor roller group"), a supply roll 101, a winding roll 103, supports 105, circulation filtration units 107, six power supplies 109, 110, 111, 112, 113, 114, a tab cleaner 117, a recovery unit 119, and end portion sensors 121.

The doping baths 17, 19, 21 correspond to a part of the doping unit. The conveyor roller group corresponds to a conveyor unit.

The electrolyte solution treatment bath 15 is a rectangular bath having an opening on an upper side. The electrolyte solution treatment bath 15 comprises a bottom surface having a substantially U-shaped section. The electrolyte solution treatment bath 15 comprises a partition plate 123. The partition plate 123 is supported by a support rod 125 that penetrates an upper end of the partition plate 123. The support rod 125 is fixed to a wall or the like (not shown). The partition plate 123 extends vertically, and divides an inside of the electrolyte solution treatment bath 15 into two spaces. When the electrode 1 passes through the inside of the electrolyte solution treatment bath 15, the electrolyte solution is immersed in the electrode 1. The electrolyte solution is impregnated into the electrode 1, whereby the electrode 1 is easily pre-doped in the doping baths 17, 19, 21.

The conveyor roller 33 is attached to a lower end of the partition plate 123. The partition plate 123 and the conveyor roller 33 are penetrated and supported by a support rod 127. The partition plate 123 comprises a cutout in a vicinity of the lower end to avoid contact with the conveyor roller 33. There is a space between the conveyor roller 33 and the bottom surface of the electrolyte solution treatment bath 15.

Descriptions will be given of a configuration of the doping bath 17 with reference to FIG. 4. The doping bath 17 comprises an upstream bath 131 and a downstream bath 133. The upstream bath 131 is arranged on a supply roll 101 side (hereinafter referred to as an upstream side), and the downstream bath 133 is arranged on a winding roll 103 side (hereinafter referred to as a downstream side).

First, a configuration of the upstream bath 131 will be described. The upstream bath 131 is a rectangular bath with an opening on an upper side. The upstream bath 131 comprises a bottom surface having a substantially U-shaped section. The upstream bath 131 comprises a partition plate 135 and four counter electrode units 137, 139, 141, 143.

The partition plate 135 is supported by a support rod 145 that penetrates an upper end of the partition plate 135. The support rod 145 is fixed to a wall or the like (not shown). The partition plate 135 extends vertically, and divides an inside of the upstream bath 131 into two spaces. The conveyor roller 40 is attached to a lower end of the partition plate 135. The partition plate 135 and the conveyor roller 40 are penetrated and supported by a support rod 147. The partition plate 135 comprises a cutout in a vicinity of the lower end to avoid contact with the conveyor roller 40. There is a space between the conveyor roller 40 and the bottom surface of the upstream bath 131.

The counter electrode unit 137 is arranged in an upstream portion of the upstream bath 131. The counter electrode units 139, 141 are arranged so as to hold the partition plate 135 from both sides. The counter electrode unit 143 is arranged in a downstream portion of the upstream bath 131.

There is a space 149 between the counter electrode unit 137 and the counter electrode unit 139. There is a space 151 between the counter electrode unit 141 and the counter electrode unit 143. The counter electrode units 137, 139, 141, 143 are connected to a terminal 109B of a power supply 109. The counter electrode units 137, 139, 141, 143 have similar configurations. Herein, descriptions will be given of configurations of the counter electrode units 137, 139 with reference to FIG. 5.

The counter electrode units 137, 139 each have a structure, in which a conductive base material 153, an alkali metal-containing plate 155, and a porous insulating member 157 are stacked. Examples of a material for the conductive base material 153 include copper, stainless steel, and nickel. The alkali metal-containing plate 155 is not limited to a specific form, and may be, for example, an alkali metal plate, or an alkali metal alloy plate. The alkali metal-containing plate 155 may have a thickness of, for example, 0.03 to 6 mm The porous insulating member 157 has a plate shape. The porous insulating member 157 is stacked on the alkali metal-containing plate 155. The plate shape of the porous insulating member 157 is a shape in a state where the porous insulating member 157 is stacked on the alkali metal-containing plate 155. The porous insulating member 157 may be a member that maintains a certain shape by itself or may be a member that can easily change its form, such as a net.

The porous insulating member 157 is porous. Thus, a dope solution described later can pass through the porous insulating member 157. This allows the alkali metal-containing plate 155 to come into contact with the dope solution.

Examples of the porous insulating member 157 may include a mesh made of resin or the like. Examples of the resin include polyethylene, polypropylene, nylon, polyetheretherketone, and polytetrafluoroethylene. An opening of the mesh may be appropriately specified, and may be, for example, in a range of 0.1 μm to 10 mm, and preferably in a range of 0.1 to 5 mm. A thickness of the mesh may be appropriately specified, and may be, for example, in a range of 1 μm to 10 mm, and preferably in a range of 30 μm to 1 mm. A percentage of open area of the mesh may be appropriately specified, and may be, for example, in a range of 5 to 98%, preferably in a range of 5 to 95%, and more preferably in a range of 50 to 95%

The porous insulating member 157 may be entirely made from an insulating material or may partially comprise an insulating layer.

The downstream bath 133 has a configuration basically similar to that of the upstream bath 131. There is the conveyor roller 46 instead of the conveyor roller 40 inside the downstream bath 133. The counter electrode units 137, 139, 141, 143 provided in the downstream bath 133 are connected to one electrode of the power supply 110.

The doping bath 19 has a configuration basically similar to that of the doping bath 17. There are the conveyor rollers 52, 58 instead of the conveyor rollers 40, 46 inside the doping bath 19. The counter electrode units 137, 139, 141, 143 provided in the upstream bath 131 of the doping bath 19 are connected to one electrode of the power supply 111. The counter electrode units 137, 139, 141, 143 provided in the downstream bath 133 of the doping bath 19 are connected to one electrode of the power supply 112.

The doping bath 21 has a configuration basically similar to that of the doping bath 17. There are the conveyor rollers 64, 70 instead of the conveyor rollers 40, 46 inside the doping bath 21. The counter electrode units 137, 139, 141, 143 provided in the upstream bath 131 of the doping bath 21 are connected to one electrode of the power supply 113. The counter electrode units 137, 139, 141, 143 provided in the downstream bath 133 of the doping bath 21 are connected to one electrode of the power supply 114.

The cleaning bath 23 has a configuration basically similar to that of the electrolyte solution treatment bath 15. There is the conveyor roller 75 instead of the conveyor roller 33 inside the cleaning bath 23.

The conveyor rollers 37, 39, 43, 45, 49, 51, 55, 57, 61, 63, 67, 69 in the conveyor roller group are made from an electrically conductive material. Other conveyor rollers in the conveyor roller group are made from an elastomer except for bearing portions thereof. The conveyor roller group conveys the electrode 1 along a specified path. The path along which the conveyor roller group conveys the electrode 1 runs from the supply roll 101 to the winding roll 103, sequentially through the inside of the electrolyte solution treatment bath 15, the inside of the doping bath 17, the inside of the doping bath 19, the inside of the doping bath 21, the inside of the cleaning bath 23, and the inside of the tab cleaner 117 in this order.

A part of the path passing through the inside of the electrolyte solution treatment bath 15 first runs downward through the conveyor rollers 29, 31, and then is turned upward by the conveyor roller 33.

A part of the above-described path passing through the inside of the doping bath 17 is as follows. The part is first turned downward by the conveyor roller 37, and runs downward in the space 149 in the upstream bath 131. Then the part is turned upward by the conveyor roller 40, and runs upward in the space 151 in the upstream bath 131. Subsequently, the part of the path is turned downward by the conveyor rollers 41, 43, and runs downward in the space 149 in the downstream bath 133. Then the part is turned upward by the conveyor roller 46, and runs upward in the space 151 in the downstream bath 133. The part of the path lastly is turned to run horizontally by the conveyor roller 47, and runs toward the doping bath 19.

A part of the above-described path passing through the inside of the doping bath 19 is as follows. The part is first turned downward by the conveyor roller 49, and runs downward in the space 149 in the upstream bath 131. Then the part is turned upward by the conveyor roller 52, and runs upward in the space 151 in the upstream bath 131. Subsequently, the part of the path is turned downward by the conveyor rollers 53, 55, and runs downward in the space 149 in the downstream bath 133. Then the part is turned upward by the conveyor roller 58, and runs upward in the space 151 in the downstream bath 133. The part of the path lastly is turned to run horizontally by the conveyor roller 59, and runs toward the doping bath 21.

A part of the above-described path passing through the inside of the doping bath 21 is as follows. The part is first turned downward by the conveyor roller 61, and runs downward in the space 149 in the upstream bath 131. Then the part is turned upward by the conveyor roller 64, and runs upward in the space 151 in the upstream bath 131. Subsequently, the part of the path is turned downward by the conveyor rollers 65, 67, and runs downward in the space 149 in the downstream bath 133. Then the part is turned upward by the conveyor roller 70, and runs upward in the space 151 in the downstream bath 133. The part of the path lastly is turned to run horizontally by the conveyor roller 71, and runs toward the cleaning bath 23.

Further, a part of the above-described path passing through the inside of the cleaning bath 23 is first turned downward by the conveyor roller 73 and runs downward, and then is turned upward by the conveyor roller 75.

The electrode 1 is wound around the supply roll 101. Specifically, the supply roll 101 retains the electrode 1 in a wound-up state. The active material of the electrode 1 retained by the supply roll 101 is not yet doped with an alkali metal.

The conveyor roller group draws the electrode 1 retained around the supply roll 101, and conveys the electrode 1. The winding roll 103 winds up the electrode 1 conveyed by the conveyor roller group, and stores the electrode 1. The electrode 1 stored around the winding roll 103 has been subjected to a pre-doping process in the doping baths 17, 19, 21. Thus, the active material of the electrode 1 stored around the winding roll 103 has been doped with an alkali metal.

The supports 105 support the electrolyte solution treatment bath 15, the doping baths 17, 19, 21, and the cleaning bath 23 from below. The supports 105 are changeable in height. The circulation filtration unit 107 is provided in each of the doping baths 17, 19, 21. The circulation filtration unit 107 comprises a filter 161, a pump 163, and a pipe 165.

In the circulation filtration unit 107 provided in the doping bath 17, the pipe 165 is a circulation pipe that extends from the doping bath 17, sequentially passes through the pump 163 and the filter 161, and then returns to the doping bath 17. The dope solution in the doping bath 17 is circulated through the pipe 165 and the filter 161 by a driving force of the pump 163, and is returned to the doping bath 17. At this time, foreign matters and the like in the dope solution are filtered by the filter 161. Examples of the foreign matters include foreign matters precipitated from the dope solution and foreign matters produced from the electrode 1. Examples of a material for the filter 161 may include resin, such as polypropylene and polytetrafluoroethylene. A pore size of the filter 161 may be appropriately specified, and may be in a range of, for example, 0.2 μm to 50 μm.

The circulation filtration units 107 provided in the doping baths 19, 21 each also have a configuration, action and effects similar to those of the above-described circulation filtration unit 107. In FIG. 3 and FIG. 4, illustration of the dope solution is omitted for the purpose of convenience.

Figure 4:
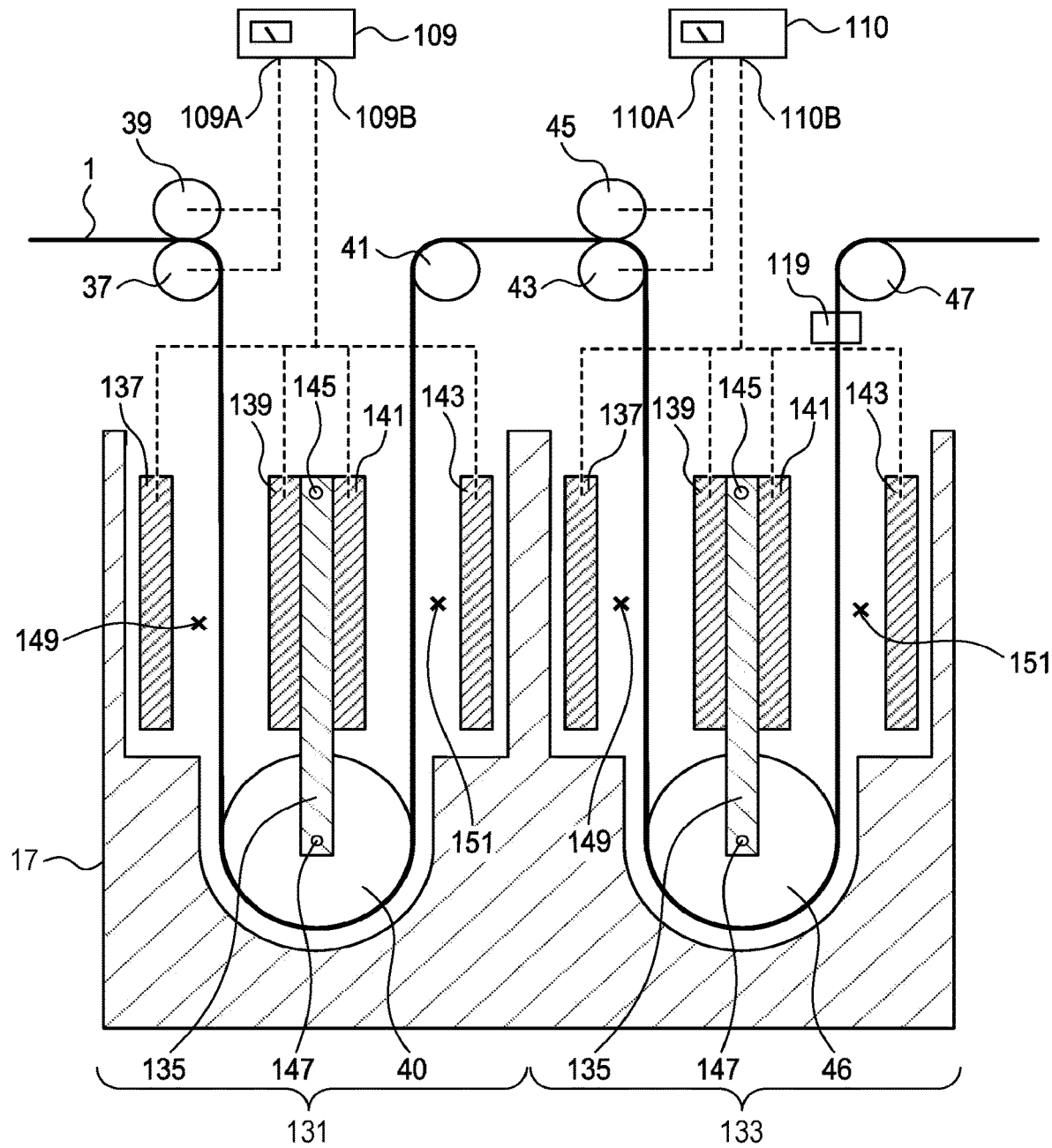
FIG. 4 is an explanatory diagram showing a configuration of a doping bath.
Figure 5:
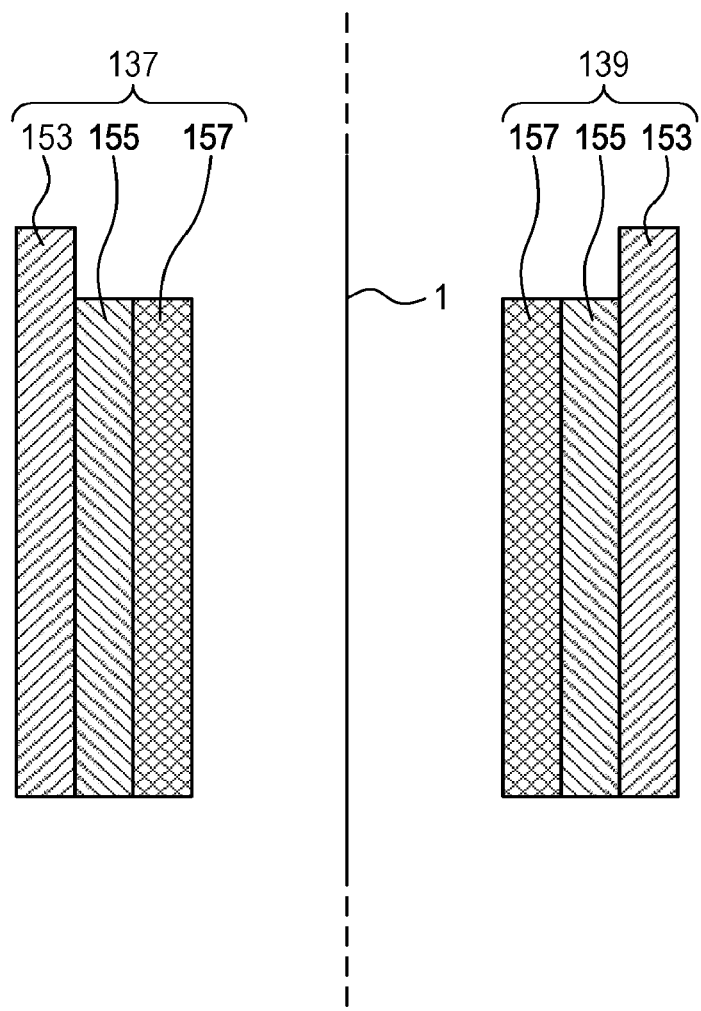
FIG. 5 is an explanatory diagram showing a configuration of a counter electrode unit.

As shown in FIG. 4, a terminal 109A of the power supply 109 is connected to the conveyor rollers 37, 39. The terminal 109B of the power supply 109 is connected to the counter electrode units 137, 139, 141, 143 provided in the upstream bath 131 of the doping bath 17. The electrode 1 comes into contact with the conveyor rollers 37, 39. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the upstream bath 131 of the doping bath 17.

As shown in FIG. 4, a terminal 110A of the power supply 110 is connected to the conveyor rollers 43, 45. A terminal 110B of the power supply 110 is connected to the counter electrode units 137, 139, 141, 143 provided in the downstream bath 133 of the doping bath 17. The electrode 1 comes into contact with the conveyor rollers 43, 45. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the downstream bath 133 of the doping bath 17.

One terminal of the power supply 111 is connected to the conveyor rollers 49, 51. The other terminal of the power supply 111 is connected to the counter electrode units 137, 139, 141, 143 provided in the upstream bath 131 of the doping bath 19. The electrode 1 comes into contact with the conveyor rollers 49, 51. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the upstream bath 131 of the doping bath 19.

One terminal of the power supply 112 is connected to the conveyor rollers 55, 57. The other terminal of the power supply 112 is connected to the counter electrode units 137, 139, 141, 143 provided in the downstream bath 133 of the doping bath 19. The electrode 1 comes into contact with the conveyor rollers 55, 57. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the downstream bath 133 of the doping bath 19.

One terminal the power supply 113 is connected to the conveyor rollers 61, 63. The other terminal of the power supply 113 is connected to the counter electrode units 137, 139, 141, 143 provided in the upstream bath 131 of the doping bath 21. The electrode 1 comes into contact with the conveyor rollers 61, 63. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the upstream bath 131 of the doping bath 21.

One terminal of the power supply 114 is connected to the conveyor rollers 67, 69. The other terminal of the power supply 114 is connected to the counter electrode units 137, 139, 141, 143 provided in the downstream bath 133 of the doping bath 21. The electrode 1 comes into contact with the conveyor rollers 67, 69. The electrode 1 and the counter electrode units 137, 139, 141, 143 are disposed in the dope solution, which is an electrolyte solution. Thus, the electrode 1 and the counter electrode units 137, 139, 141, 143 are electrically connected with each other through the electrolyte solution in the downstream bath 133 of the doping bath 21.

The tab cleaner 117 cleans the active material layer unformed portion 7 of the electrode 1. A configuration of the tab cleaner 117 will be detailed later. The recovery unit 119 is arranged in each of the electrolyte solution treatment bath 15, the doping baths 17, 19, 21, and the cleaning bath 23.

The recovery unit 119 collects the solution that the electrode 1 carries away from the bath, and returns the solution to the bath.

The end portion sensor 121 detects a position of an end portion of the electrode 1 in a width direction W of the electrode 1. Based on the detection result of the end portion sensor 121, an end position adjuster unit 241, which will be described later, adjusts positions of the supply roll 101 and the winding roll 103 in the width direction W.

3. Configuration of Tab Cleaner 117

Figure 6:
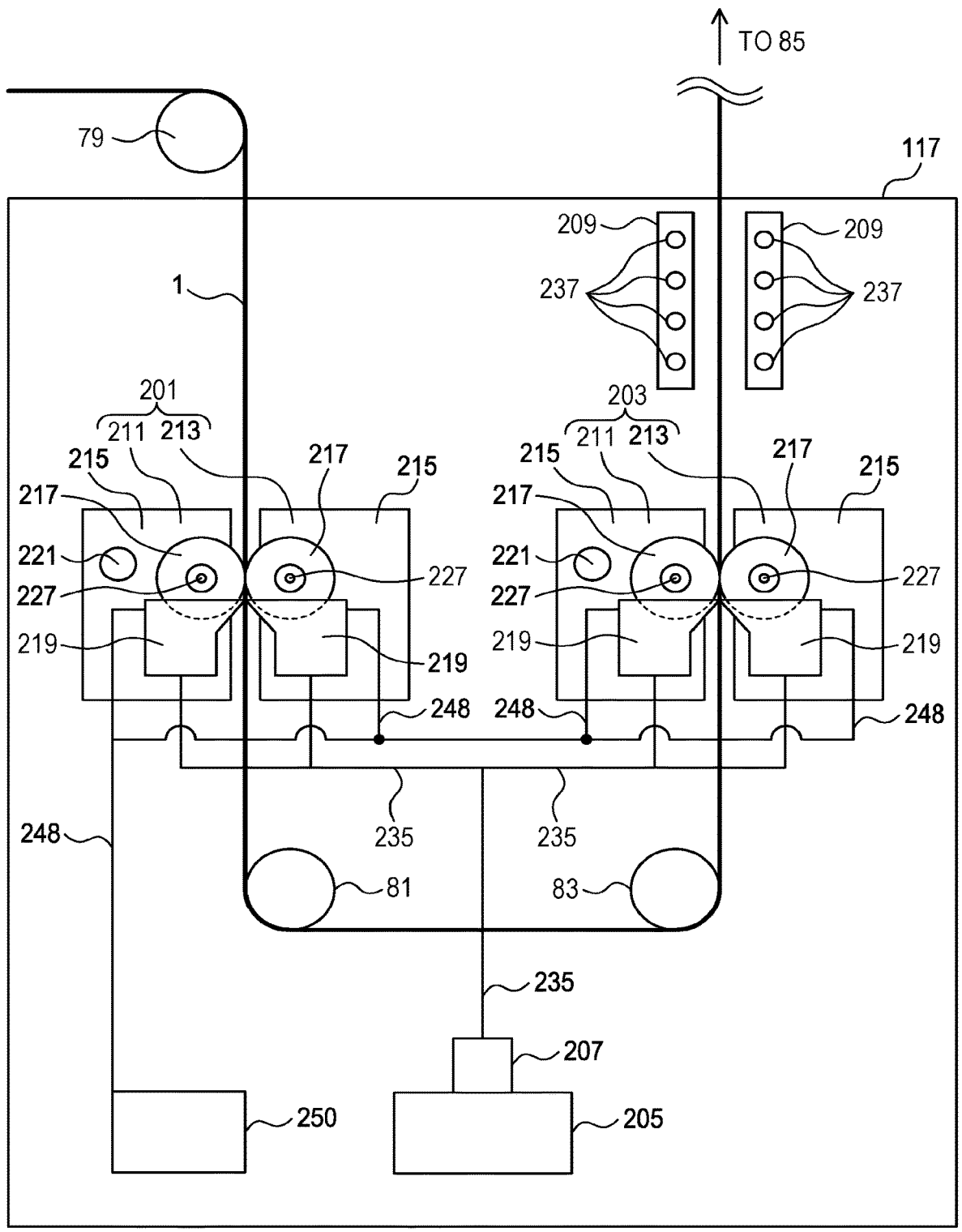
FIG. 6 is an explanatory diagram showing a configuration of a tab cleaner.

Descriptions will be given of the configuration of the tab cleaner 117 with reference to FIG. 6 to FIG. 9. The tab cleaner 117 corresponds to a cleaning unit. As shown in FIG. 6, the tab cleaner 117 comprises: cleaning roller units 201, 203; a cleaning liquid tank 205; a pump 207; a dryer unit 209; an overflow pipe 248; and a waste liquid tank 250.

The cleaning roller unit 201 is disposed between the conveyor roller 79 and the conveyor roller 81.

The cleaning roller unit 201 comprises a first portion 211, and a second portion 213. The first portion 211 and the second portion 213 are arranged so as to hold the electrode 1 from both sides.

Figure 7:
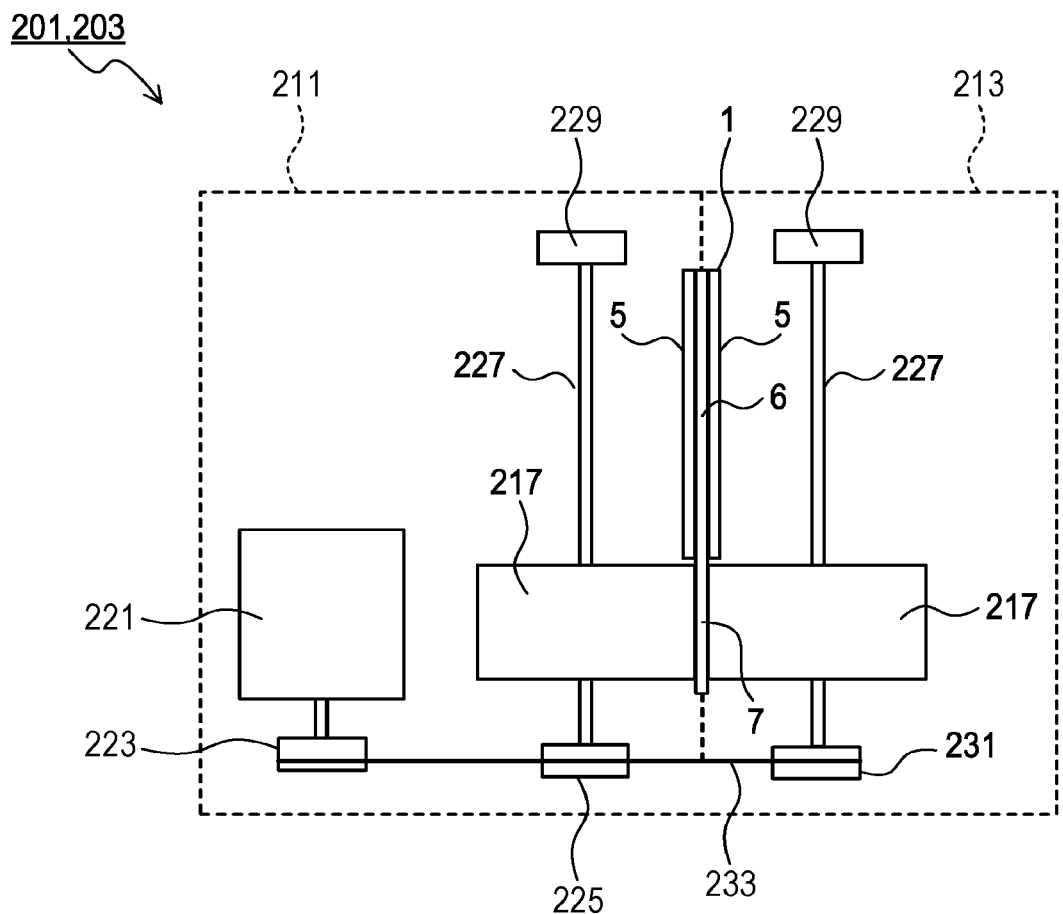
FIG. 7 is an explanatory diagram showing a configuration of a cleaning roller unit seen from above.

As shown in FIG. 6, the first portion 211 comprises: a support plate 215; a brush roller 217; a cleaning tank 219; and a motor 221. The brush roller 217 corresponds to a cleaning roller. The cleaning tank 219 corresponds to a tab cleaning tank. As shown in FIG. 7, the first portion 211 comprises: a pulley 223; a pulley 225; and a shaft 227. Illustrations of the pulley 223 and the pulley 225 are omitted in FIG. 6 for the purpose of convenience.

The support plate 215 is a plate-shaped member. The brush roller 217 is attached to the shaft 227. An outer peripheral portion of the brush roller 217 is formed of brush. A hardness of the brush roller 217 specified by JIS S 3016-1995 is generally in a range of 1 N/cm$^2$ to 1000 N/cm$^2$, preferably in a range of 5 N/cm$^2$ to 500 N/cm$^2$, more preferably in a range of 10 N/cm$^2$ to 300 N/cm$^2$, and particularly preferably in a range of 20 N/cm$^2$ to 100 N/cm$^2$. The hardness of the brush roller 217 means a hardness of the brush situated on the outer peripheral portion.

Examples of a brush material having such a hardness include plastic, and animal fiber. The brush material is a material for the brush roller 217. Examples of the plastic include polyethylene, polypropylene, polyvinyl chloride, polyethylene terephthalate, polybutylene terephthalate, acrylic, nylon, polycarbonate, polyphenylene sulfide, polyetheretherketone, and polytetrafluoroethylene. Examples of the animal fiber include horsehair, swine hair, and goat hair.

The shaft 227 is pivotably supported by a bearing 229 that is provided to the support plate 215. Axial directions of the shaft 227 and the brush roller 217 are parallel to the width direction W of the electrode 1.

In the present embodiment, the brush roller 217 is employed as the cleaning roller. Alternatively, a sponge roller may be employed as the cleaning roller. In a case where a sponge roller is employed as the cleaning roller, a hardness of the sponge roller as measured with a type E durometer specified by JIS K 6253-3 is preferably in a range of 1 to 40.

Examples of the sponge material having such a hardness include elastomer. The sponge material denotes a material of the sponge roller. Examples of the elastomer include polyolefin rubber, styrene rubber, styrene butadiene rubber, polyurethane, chloroprene rubber, ethylene propylene diene rubber, nitrile rubber, silicone rubber, fluororubber, and polyvinyl alcohol.

The cleaning tank 219 is fixed to the support plate 215 under the brush roller 217. The cleaning tank 219 stores the cleaning liquid. The cleaning liquid stored in the cleaning tank 219 is, for example, a carbonate-based solvent. Examples of the carbonate-based solvent include, dimethyl carbonate, ethyl methyl carbonate, and diethyl carbonate. The cleaning tank 219 is open on an upper side. A part of a lower side of the brush roller 217 gets into the cleaning tank 219, and is immersed in the cleaning liquid.

The motor 221 is attached to the support plate 215. The pulley 223 is attached to the motor 221. The pulley 225 is attached to the shaft 227.

The second portion 213 basically has a configuration that is laterally reversed with respect to the first portion 211 in FIG. 6. However, the second portion 213 does not comprise the motor 221. As shown in FIG. 7, a pulley 231 is attached to the shaft 227 of the second portion 213.

The first portion 211 and the second portion 213 each are movable between a position close to the electrode 1 (hereinafter to be referred to as a close position) and a position distanced from the electrode 1 (hereinafter to be referred to as a distanced position). When the electrode 1 is pre-doped, the first portion 211 and the second portion 213 are positioned at the close positions. When the first portion 211 and the second portion 213 arc at the close positions, as shown in FIG. 7, the brush roller 217 of the first portion 211 and the brush roller 217 of the second portion 213 each come into contact with the active material layer unformed portion 7 of the electrode 1. Neither the brush roller 217 of the first portion 211 nor the brush roller 217 of the second portion 213 comes into contact with the active material layer formed portion 6.

When the first portion 211 and the second portion 213 are at the distanced positions, neither the brush roller 217 of the first portion 211 nor the brush roller 217 of the second portion 213 comes into contact with any part of the electrode 1. When the electrode 1 is passed through the electrode manufacturing system 11, the first portion 211 and the second portion 213 are set at the distanced positions.

Figure 8:
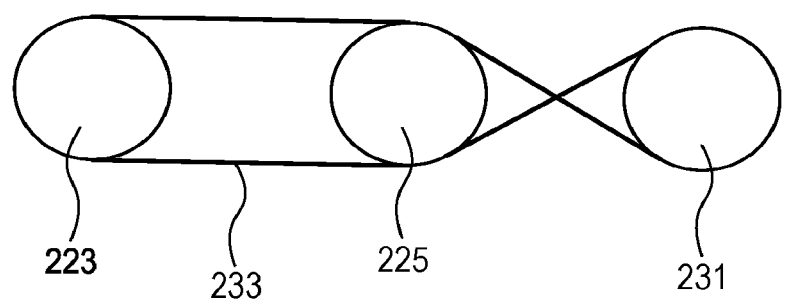
FIG. 8 is an explanatory diagram showing configurations of a pulley and a belt seen from front.

As shown in FIG. 8, a belt 233 is looped around the pulley 223, the pulley 225, and the pulley 231. The belt 233 is looped in the shape of the number eight across the pulley 225 and the pulley 231. In FIG. 8, if the motor 221 rotates clockwise, the pulley 225 and the brush roller 217 of the first portion 211 also rotate clockwise. On the other hand, the pulley 231 and the brush roller 217 of the second portion 213 rotate counterclockwise. That is, the brush roller 217 of the first portion 211 and the brush roller 217 of the second portion 213 rotate in opposite directions.

As shown in FIG. 6, the cleaning roller unit 203 is arranged between the conveyor roller 83 and the conveyor roller 85. The cleaning roller unit 203 has a configuration similar to that of the cleaning roller unit 201.

The cleaning liquid tank 205 stores the cleaning liquid. The cleaning liquid tank 205 communicates with the cleaning tanks 219 of the cleaning roller units 201, 203 via the pump 207 and a pipe 235. An operation of the pump 207 gradually replaces the cleaning liquid in the cleaning tanks 219 of the cleaning roller units 201, 203 with the cleaning liquid in the cleaning liquid tank 205. That is, the pump 207 supplies the cleaning liquid to the cleaning tanks 219 of the cleaning roller units 201, 203. The cleaning liquid tank 205, the pump 207, and the pipe 235 correspond to a cleaning liquid supplier unit.

The dryer unit 209 is arranged between the cleaning roller unit 203 and the conveyor roller 85. The dryer unit 209 comprises a plurality of blow nozzles 237. The plurality of blow nozzles 237 blow nitrogen, which has a dew point of −40 deg. C. or lower, to the electrode 1, to dry the electrode 1.

The overflow pipe 248 drains the cleaning liquid overflown from the cleaning tanks 219 to the waste liquid tank 250. The waste liquid tank 250 stores the cleaning liquid flown down through the overflow pipe 248.

Figure 9:
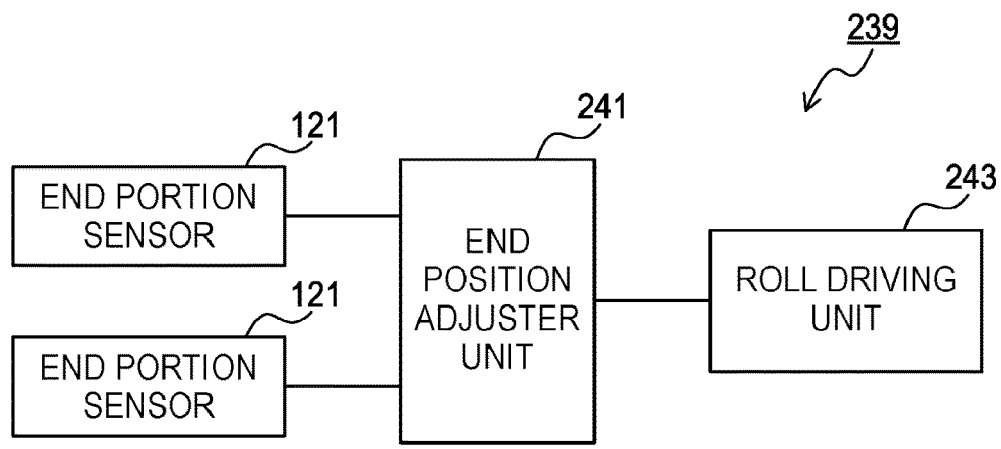
FIG. 9 is a block diagram showing a configuration of a control system.

The electrode manufacturing system 11 comprises a control system 239 shown in FIG. 9. The control system 239 comprises the end position adjuster unit 241, two end portion sensors 121, and a roll driving unit 243. As shown in FIG. 3, one of the two end portion sensors 121 is disposed near the supply roll 101. The other one of the two end portion sensors 121 is disposed near the winding roll 103.

The end position adjuster unit 241 is a computer including a CPU, a memory, and the like. The roll driving unit 243 is capable of changing positions of the supply roll 101 and the winding roll 103 in the width direction W. If the positions of the supply roll 101 and the winding roll 103 in the width direction W change, the position of the electrode 1 in the width direction W changes.

Processes executed by the control system 239 are described below. The end position adjuster unit 241 uses the end portion sensors 121 to detect end positions of the electrode 1 in the width direction W near the supply roll 101 and near the winding roll 103. Based on the detection result, the end position adjuster unit 241 adjusts positions of the supply roll 101 and the winding roll 103 in the width direction W using the roll driving unit 243. The supply roll 101 and the winding roll 103 after the adjustment are situated at positions where the brush roller 217 is in contact with the active material layer unformed portion 7, and is not in contact with the active material layer formed portion 6.

4. Composition of Dope Solution

When the electrode manufacturing system 11 is used, the dope solution is stored in the electrolyte solution treatment bath 15, and the doping baths 17, 19, 21. The dope solution contains alkali metal ions and solvent. The dope solution is an electrolyte solution.

Examples of the solvent may include an organic solvent. The organic solvent is preferably an aprotic organic solvent. Examples of the aprotic organic solvent include ethylene carbonate, propylene carbonate, butylene carbonate, dimethyl carbonate, diethyl carbonate, methyl ethyl carbonate, 1-fluoroethylene carbonate, γ-butyrolactone, acetonitrile, dimethoxyethane, tetrahydrofuran, dioxolane, methylene chloride, sulfolane, diethylene glycol dimethyl ether (diglyme), diethylene glycol methyl ethyl ether, triethylene glycol dimethyl ether (triglyme), triethylene glycol butyl methyl ether, and tetraethylene glycol dimethyl ether (tetraglyme).

As the organic solvent, ionic liquids of a quaternary imidazolium salt, quaternary pyridinium salt, quaternary pyrrolidinium salt, quaternary piperidinium salt, and the like, may be used. The organic solvent may be made of a single component, or may be a mixed solvent of two or more types of components. The organic solvent may be made of a single component, or may be a mixed solvent of two or more types of components.

The alkali metal ions included in the dope solution form an alkali metal salt. The alkali metal salt is preferably a lithium salt or a sodium salt. Examples of an anionic moiety forming the alkali metal salt may include phosphorus anion having a fluoro group, such as $PF_6^-$, $PF_3(C_2F_5)_3^-$, and $PF_3(CF_3)_3^-$; boron anion having a fluoro group or a cyano group, such as $BF_4^-$, $BF_2(CF)_2^-$, $BF_3(CF_3)^-$, and $B(CN)_4^-$; sulfonyl imide anion having a fluoro group, such as $N(FSO_2)_2^-$, $N(CF_3SO_2)_2^-$, and $N(C_2F_5SO_2)_2^-$; and organic sulfonic acid anion having a fluoro group, such as $CF_3SO_3^-$.

A concentration of the alkali metal salt in the dope solution is preferably 0.1 mol/L or more, and more preferably within a range of 0.5 to 1.5 mol/L. With the concentration of the alkali metal salt within this range, pre-doping of alkali metal proceeds efficiently.

The dope solution may further comprise additives, such as vinylene carbonate, vinylethylene carbonate, 1-fluoroethylene carbonate, 1-(trifluoromethyl) ethylene carbonate, succinic anhydride, maleic anhydride, propane sultone, and diethyl sulfone.

The dope solution may further comprise a flame retardant, such as a phosphazene compound. From a viewpoint of effective control of a thermal runaway reaction while doping the alkali metal, an added amount of the flame retardant is preferably 1 part by mass or more, more preferably 3 parts by mass or more, and further preferably 5 parts by mass or more, with respect to 100 parts by mass of the dope solution. From a viewpoint of obtaining a high-quality doped electrode, the added amount of the flame retardant is preferably 20 parts by mass or less, more preferably 15 parts by mass or less, and further preferably 10 parts by mass or less, with respect to 100 parts by mass of the dope solution.

5. Electrode Manufacturing Method Using Electrode Manufacturing System 11

A method for manufacturing the pre-doped electrode 1 is as follows. The electrode 1 before pre-doping is wound around the supply roll 101. Subsequently, the electrode 1 before pre-doping is drawn out from the supply roll 101, and is passed along the above-described path to the winding roll 103. At this time, the first portion 211 and the second portion 213 that form each of the cleaning roller units 201, 203 of the tab cleaner 117 are positioned at the distanced positions. The electrolyte solution treatment bath 15, the doping baths 17, 19, 21, and the cleaning bath 23 are raised and set at specified positions shown in FIG. 3.

Subsequently, the dope solution is stored in the electrolyte solution treatment bath 15, and the doping baths 17, 19, 21. The dope solution is as described in "4. Composition of Dope Solution". The cleaning liquid is stored in the cleaning bath 23. The cleaning liquid stored in the cleaning bath 23 is an organic solvent. Examples of the organic solvent include dimethyl carbonate, ethyl methyl carbonate, and diethyl carbonate. The first portion 211 and the second portion 213, which form each of the cleaning roller units 201, 203 of the tab cleaner 117, are positioned at the close positions.

Then, the conveyor roller group conveys the electrode 1 from the supply roll 101 to the winding roll 103 along the above-described path. The path for conveying the electrode 1 passes through the insides of the doping baths 17, 19, 21. While the electrode 1 passes through the insides of the doping baths 17, 19, 21, the active material contained in the active material layer 5 is pre-doped with an alkali metal.

The conveyor roller group further conveys the electrode 1 to the cleaning bath 23. The electrode 1 is cleaned in the cleaning bath 23 while being conveyed by the conveyor roller group.

The conveyor roller group continuously conveys the electrode 1 to the tab cleaner 117. A part of the electrode 1 conveyed to the tab cleaner 117 has been already subjected to the pre-doping process.

The cleaning roller units 201, 203 of the tab cleaner 117 each clean the active material layer unformed portion 7 of the electrode 1. An area to be cleaned is the active material layer unformed portion 7 that is adjacent to the active material layer formed portion 6, which has been already subjected to the pre-doping process. Being adjacent means, for example, being adjacent in the width direction W. The cleaning performed by the cleaning roller units 201, 203 is as follows. The cleaning means to remove at least a part of the dope solution from at least the active material layer unformed portion 7.

The brush roller 217 of the first portion 211 and the brush roller 217 of the second portion 213 each come into contact with the active material layer unformed portion 7 while rotating. The brush roller 217 of the first portion 211 and the brush roller 217 of the second portion 213 each are immersed in the cleaning liquid in the cleaning tank 219. Thus, they come into contact with the active material layer unformed portion 7 while containing the cleaning liquid. Consequently, the active material layer unformed portion 7 is cleaned.

A peripheral speed of the brush roller 217 at a part coming into contact with the electrode 1 will be referred to as V1. A conveying speed of the electrode 1 will be referred to as V2. V2 is a positive value. V1 has the same unit as V2. When a part of the brush roller 217 in contact with the electrode 1 is moved in a conveyance direction of the electrode 1, V1 takes a positive value. When the part of the brush roller 217 in contact with the electrode 1 is moved in a direction opposite to the conveyance direction of the electrode 1, V1 takes a negative value. A ratio of V1 to V2 is expressed as a ratio V1/V2. The ratio V1/V2 is a value obtained by dividing V1 by V2. The ratio V1/V2 is preferably in a range of −5.0 to 0.99, or in a range of 1.01 to 5.0 from a viewpoint of effectively cleaning the active material layer unformed portion 7 as well as steadily conveying the electrode 1. The ratio V1/V2 is more preferably in a range of 0.01 to 0.95, or in a range of 1.05 to 3.0. The ratio V1/V2 is much more preferably in a range of 0.1 to 0.9, or in a range of 1.1 to 2.0. The ratio V1/V2 is preferably not 0.

The dryer unit 209 of the tab cleaner 117 dries the electrode 1 having passed through the cleaning roller units 201, 203. Then the electrode 1 is wound by the winding roll 103.

The electrode 1 may be a positive electrode or a negative electrode. In a case of manufacturing a positive electrode, a positive electrode active material is doped with an alkali metal using the electrode manufacturing system 11, and in a case of manufacturing a negative electrode, a negative electrode active material is doped with an alkali metal using the electrode manufacturing system 11.

When lithium is occluded in a negative electrode active material of a lithium ion capacitor, a doping amount of the alkali metal is preferably 70 to 95% with respect to a theoretical capacity of the negative electrode active material. When lithium is occluded in a negative electrode active material of a lithium-ion rechargeable battery, the doping amount is preferably 10 to 30% with respect to a theoretical capacity of the negative electrode active material.

6. Effects Achieved by Electrode Manufacturing System 11

(1A) The tab cleaner 117 cleans the active material layer unformed portion 7. Thus, the electrode manufacturing system 11 can inhibit the dope solution or the like from remaining on the active material layer unformed portion 7 of the manufactured electrode 1.

(1B) The tab cleaner 117 uses the brush roller 217 that comes into contact with the active material layer unformed portion 7 to clean the active material layer unformed portion 7. Thus, the tab cleaner 117 can clean the active material layer unformed portion 7 more effectively.

(1C) A hardness of the brush roller 217 specified by JIS S 3016-1995 is in a range of 1 N/cm² to 1000 N/cm². Thus, the active material layer unformed portion 7 can be cleaned while inhibiting damages to the active material layer unformed portion 7.

(1D) When the ratio V1/V2 is in a range of −5.0 to 0.99, or in a range of 1.01 to 5.0, because of a difference between the conveying speed of the electrode 1 and the peripheral speed of the brush roller 217, the brush roller 217 can come into contact with the active material layer unformed portion 7 and also wipe out a residue of the dope solution from the active material layer unformed portion 7. Thus, the active material layer unformed portion 7 can be cleaned more efficiently.

When the ratio V1/V2 is within a range of −5.0 to 0.99, or within a range of 1.01 to 5.0, or more particularly within a range of 0.01 to 0.95, or within a range of 1.05 to 3.0, it is possible to achieve the above-described effect and also to reduce damages to or breakages of the current collector 3 or the like due to biting of the brush rollers 217 with each other. Consequently, the active material layer unformed portion 7 can be cleaned more stably.

(1E) The tab cleaner 117 comprises the cleaning tank 219. The cleaning tank 219 stores part of the brush roller 217, and the cleaning liquid. Thus, the brush roller 217 containing the cleaning liquid comes into contact with the active material layer unformed portion 7. Consequently, the tab cleaner 117 can clean the active material layer unformed portion 7 more effectively.

(1F) The tab cleaner 117 can supply the cleaning liquid to the cleaning tank 219 by using the pump 207. The tab cleaner 117 can consecutively drain the cleaning liquid that has been used during the cleaning process from the cleaning tank 219 to the waste liquid tank 250 by using the overflow pipe 248. Thus, reduction and contamination of the cleaning liquid stored in the cleaning tank 219 can be suppressed.

(1G) The active material layer unformed portion 7 has a strip-like shape extending along a longitudinal direction of the electrode 1. Thus, the tab cleaner 117 can clean the active material layer unformed portion 7 with ease.

(1H) The conveyor roller group conveys the electrode 1 along a path passing through the insides of the doping baths 17, 19, 21 to the tab cleaner 117. Thus, the pre-doping process and the cleaning of the active material layer unformed portion 7 can be performed successively.

Second Embodiment

1. Differences from First Embodiment

Since a second embodiment has a configuration basically similar to that of the first embodiment, differences therebetween will be described below. It is to be noted that the same reference numerals as those in the first embodiment indicate the same configurations, and reference should be made to the preceding description.

In the above-described first embodiment, a mechanism shown in FIG. 7 rotates the brush roller 217 of each of the cleaning roller units 201, 203. In the second embodiment, differently from the first embodiment, a mechanism shown in FIG. 10 rotates the brush roller 217 of each of the cleaning roller units 201, 203.

Figure 10:
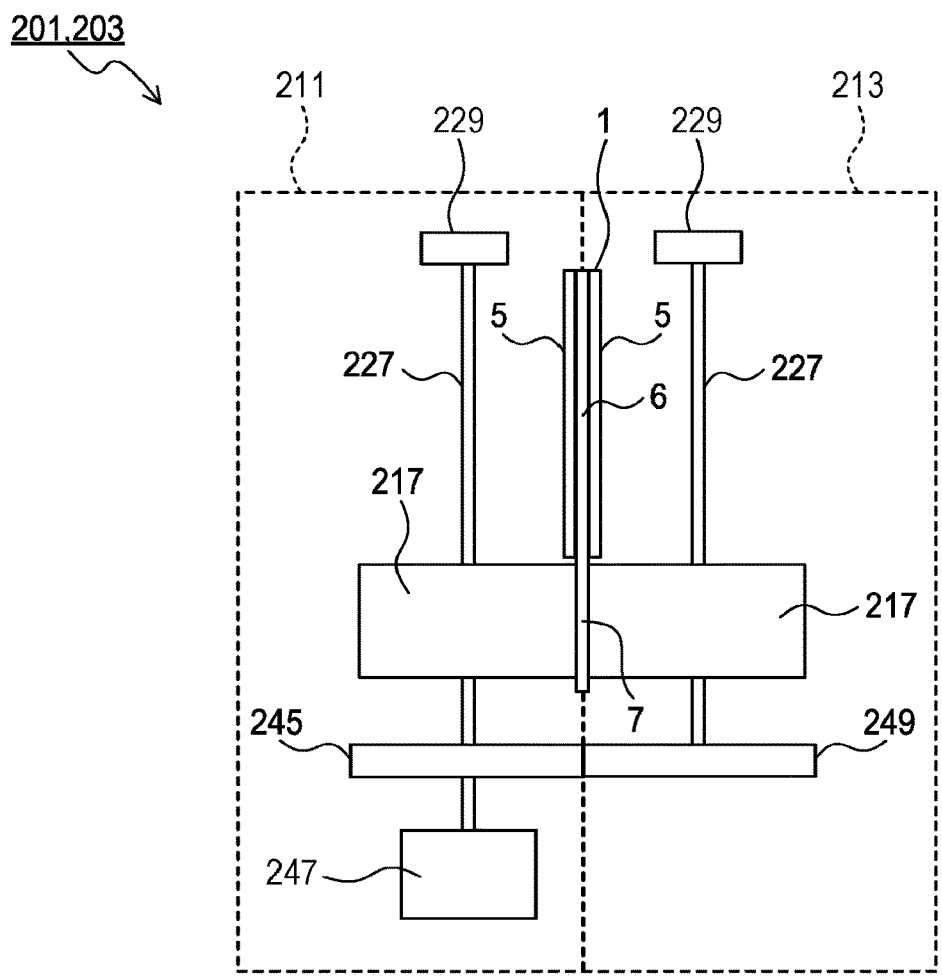
FIG. 10 is an explanatory diagram showing a configuration of the cleaning roller unit.

As shown in FIG. 10, a gear 245 and a compact motor 247 are attached to the shaft 227 of the first portion 211. The compact motor 247 is fixed. The shaft 227, the brush roller 217, and the gear 245 are rotated by a driving force of the compact motor 247.

A gear 249 is attached to the shaft 227 of the second portion 213. The gear 249 meshes with the gear 245. If the gear 245 rotates, the gear 249, and the shaft 227 and the brush roller 217 of the second portion 213 also rotate. Thus, the brush roller 217 of the first portion 211 and the brush roller 217 of the second portion 213 are rotated by the driving force of the compact motor 247. A rotating direction of the brush roller 217 of the first portion 211 is opposite to a rotating direction of the brush roller 217 of the second portion 213.

2. Effects Achieved by Electrode Manufacturing System 11

According to the second embodiment detailed above, the aforementioned effects of the first embodiment can be achieved.

Third Embodiment

1. Differences from First Embodiment

Since a third embodiment has a configuration basically similar to that of the first embodiment, differences therebetween will be described below. It is to be noted that the same reference numerals as those in the first embodiment indicate the same configurations, and reference should be made to the preceding description.

Figure 11:
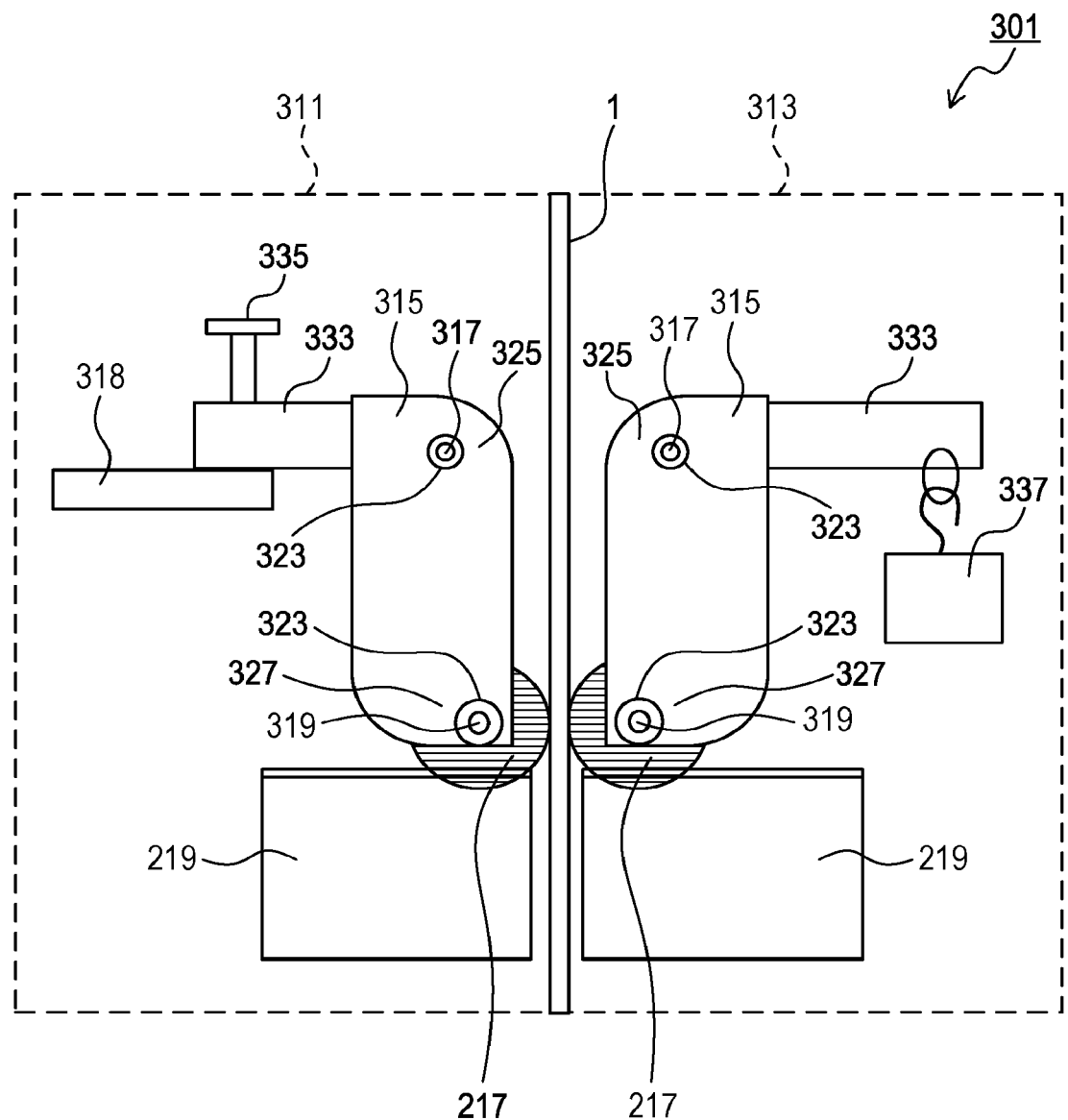
FIG. 11 is a plan view showing the configuration of the cleaning roller unit.
Figure 12:
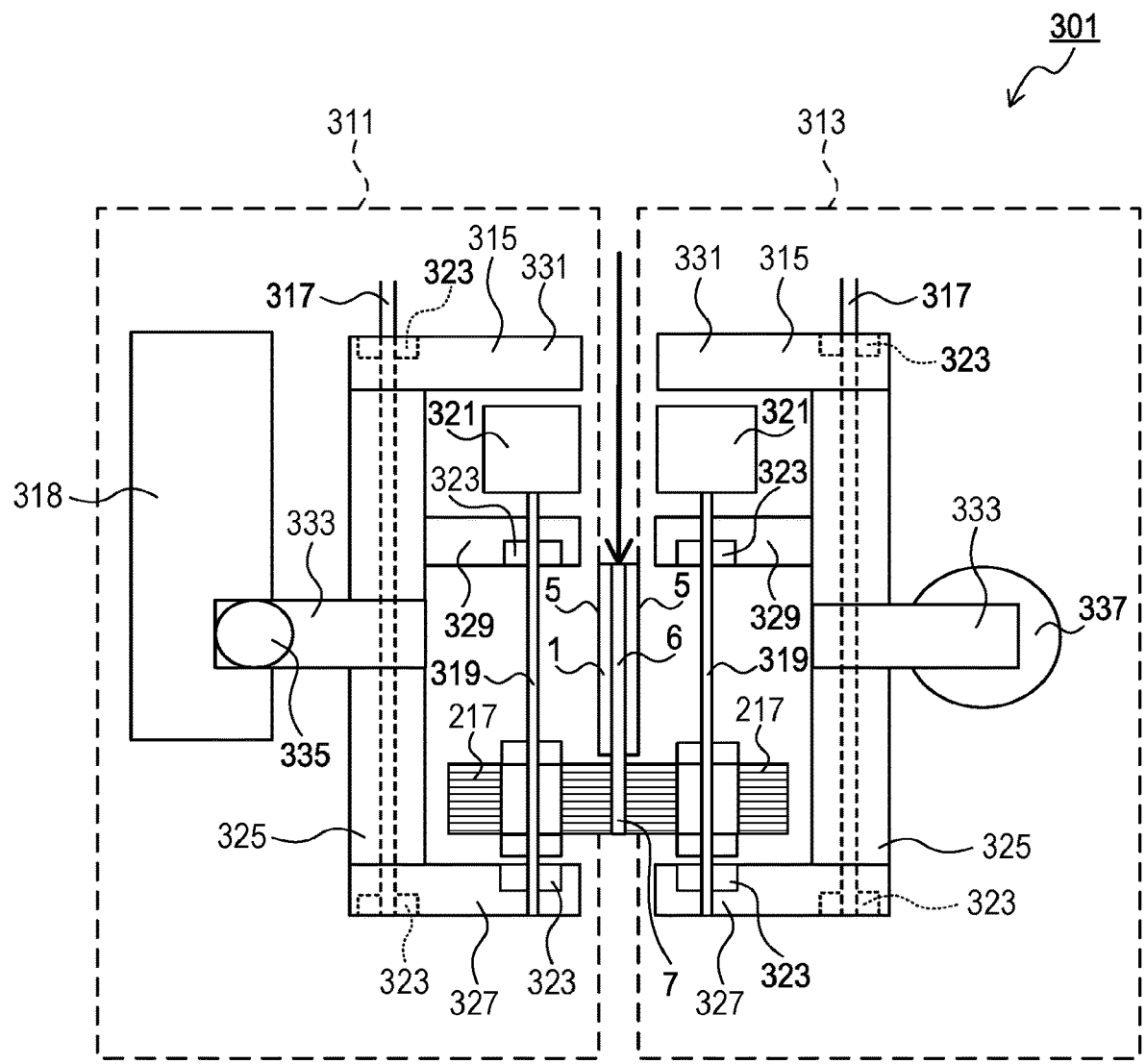
FIG. 12 is a front view showing the configuration of the cleaning roller unit.

In the first embodiment, the tab cleaner 117 comprises the cleaning roller units 201, 203 shown in FIG. 6 and FIG. 7. In the third embodiment, a cleaning roller unit 301 shown in FIG. 11 and FIG. 12 is provided instead of the cleaning roller units 201, 203.

The cleaning roller unit 301 is arranged at the position of each of the cleaning roller units 201, 203 of the first embodiment. The cleaning roller unit 301 comprises a first portion 311 and a second portion 313. The first portion 311 and the second portion 313 are arranged so as to hold the electrode 1 from both sides.

The first portion 311 comprises a brush arm 315, a supporting shaft 317, a fixed portion 318, a brush roller 217, a brush shaft 319, and a motor 321.

The brush arm 315 is attached rotatably about the supporting shaft 317. The brush arm 315 comprises a greaseless bearing 323 at a portion, to which the supporting shaft 317 is attached.

As shown in FIG. 12, the brush arm 315 comprises a main body 325, a first projection 327, a second projection 329, a third projection 331, and a fourth projection 333.

The main body 325 is a portion through which the supporting shaft 317 runs. As shown in FIG. 12, the first projection 327, the second projection 329, and the third projection 331 project toward the electrode 1 more than the main body 325 does. The first projection 327, the second projection 329, and the third projection 331 are aligned to be spaced apart from each other along the width direction W. The fourth projection 333 projects from the main body 325 in a direction opposite from the electrode 1.

The supporting shaft 317 and the fixed portion 318 each are fixed to a frame of the electrode manufacturing system 11. The fixed portion 318 may be a part of the frame of the electrode manufacturing system 11. Thus, the supporting shaft 317 and the fixed portion 318 are situated at positions fixed with respect to the conveyor roller group. An axial direction of the supporting shaft 317 is parallel to the width direction W.

The fourth projection 333 is fixed to the fixed portion 318 with a fixing screw 335. Thus, a position of the brush arm 315 is fixed.

The brush shaft 319 is rotatably supported by the first projection 327 and the second projection 329. Each of the first projection 327 and the second projection 329 comprises a greaseless bearing 323 at a portion to which the brush shaft 319 is attached. An axial direction of the brush shaft 319 is parallel to the width direction W.

The brush roller 217 is pivotally supported by the brush shaft 319. The brush roller 217 comes into contact with the active material layer unformed portion 7. The brush roller 217 does not come into contact with the active material layer formed portion 6. The brush arm 315 is adjustable in position along the width direction W. The position of the brush roller 217 along the width direction W can be adjusted by adjusting the position of the brush arm 315 along the width direction W.

The motor 321 is arranged between the second projection 329 and the third projection 331. The motor 321 drives the brush shaft 319 and the brush roller 217 to rotate.

The second portion 313 basically has a configuration that is laterally reversed with respect to the first portion 311 in FIG. 11 and FIG. 12. However, the second portion 313 does not comprise the fixed portion 318. The brush arm 315 of the second portion 313 is rotatable about the supporting shaft 317. A weight 337 is hanged from the fourth projection 333 of the second portion 313.

Thus, the brush arm 315 of the second portion 313 is biased in a direction for pressing the brush roller 217 against the electrode 1.

Other Embodiments

Although some embodiments of the present disclosure have been described as above, the present disclosure is not limited to the above-described embodiments, but may be practiced in various modified forms.

(1) A different cleaning roller than the brush roller 217 may be used.

(2) The tab cleaner 117 may clean the active material layer unformed portion 7 with a method other than a method using a cleaning roller.

(3) The number of the cleaning roller units provided to the tab cleaner 117 may be other than two, and may be, for example, one, three, four, five, or more.

(4) Following processes may be performed. The electrode 1 having been subjected to a process of doping with an alkali metal is provided to the supply roll 101. The electrode 1 is conveyed from the supply roll 101 to the tab cleaner 117, and cleaned. The cleaned electrode 1 is wound around the winding roll 103, and stored.

(5) A function served by a single element in any of the above-described embodiments may be achieved by a plurality of elements, or a function served by a plurality of elements may be achieved by a single element. A part of a configuration in any of the above-described embodiments may be omitted. At least a part of a configuration in any of the above-described embodiments may be added to, or replace, a configuration in another of the embodiments.

(6) In addition to the electrode manufacturing system described above, the present disclosure may be realized in various forms, including a higher-order system having the electrode manufacturing system as an element, a program for making a computer function as the end position adjuster unit 241, a non-transitory tangible storage medium such as a semiconductor memory in which the program is stored, a doping method, or the like.

Embodiments (Manufacturing of Electrode 1 Used in Each Embodiment and Comparative Example 1)

A long strip-shaped current collector 3 was prepared. The current collector 3 was a negative electrode current collector. Dimensions of the current collector 3 were: 150 mm in width; 100 m in length; and 8 μm in thickness. A surface roughness Ra of the current collector 3 was 0.1 μm. The current collector 3 was formed of copper foil. Negative electrode active material layers 5 were formed on both sides of the current collector 3.

A coating amount of the negative electrode active material layer 5 formed on one side of the current collector 3 was 50 g/m$^2$. The negative electrode active material layer 5 was formed along a longitudinal direction of the current collector 3. The negative electrode active material layer 5 was formed over a width of 130 mm from an end of the current collector 3 in the width direction W. A negative electrode active material layer unformed portion at the other end of the current collector 3 in the width direction W had a width of 20 mm. The negative electrode active material layer unformed portion is a portion where the negative electrode active material layer 5 is not formed. Then drying and pressing were performed, whereby the electrode 1 was obtained.

The negative electrode active material layer 5 contained a negative electrode active material, carboxymethyl cellulose, acetylene black, a binder and a dispersant at a mass ratio of 88:3:5:3:1. The negative electrode active material was a mixture of a silicon-based active material and a graphite-based active material. The negative electrode active material contained the silicon-based active material and the graphite-based active material at a mass ratio of 2:8. The acetylene black corresponds to a conductive agent.

The electrode manufacturing system 11 shown in FIG. 3 was prepared and then the electrode 1 was fed through the electrode manufacturing system 11. The doping baths 17, 19, 21 each were provided with the counter electrode units 139, 141, 143. Then the dope solution was supplied into the doping baths 17, 19, 21. The dope solution contained 1.4 M of LiPF$_6$. The solvent of the dope solution was a mixed liquid including ethylene carbonate (EC), ethyl methyl carbonate (EMC), and dimethyl carbonate (DMC) at a volume ratio of 1:1:1.

Subsequently, the electrode 1 fed through the electrode manufacturing system 11 and the counter electrode units 139, 141, 143 were connected to a direct current power source having a current/voltage monitor, and a current of 5A was conducted while the electrode 1 was conveyed at a speed of 0.1 m/min. At that time, the center of the negative electrode active material layer 95 of the electrode 1 in the width direction W coincided with the center of the lithium metal plate of the counter electrode unit 51 in the width direction W. An energization time was set, in consideration of the irreversible capacity, to a time in which a ratio of lithium doping in the negative electrode active material layer 5 became 15% of a discharge capacity C2 of the negative electrode.

It is to be noted that the irreversible capacity was estimated in advance by measuring the discharge capacity of the electrode 1 having been doped with the lithium. Through this process, the negative electrode active material in the negative electrode active material layer 95 was doped with the lithium, whereby the electrode 1 became a pre-doped negative electrode. The electrode 1 is a negative electrode for a lithium-ion rechargeable battery.

The electrode 1 was passed through the cleaning bath 23, and then was wound. Dimethyl carbonate (DMC) at 25 degrees C. was stored in the cleaning bath 23. In this way, the pre-doped electrode 1 was manufactured.

Example 1

The electrode 1 manufactured as above was again fed through the electrode manufacturing system 11 of the third embodiment. A brush roller made from polypropylene with a wire diameter of 0.1 mm was used as the brush roller 217. A hardness of the brush roller specified by JIS S 3016-1995 was 40 N/cm$^2$. The weight 337 weighed 300 g. The dope solution was supplied into the doping baths 17, 19, 21.

The electrode 1 was cleaned using the tab cleaner 117 while the electrode 1 was conveyed at a speed of 1.0 m/min. The peripheral speed V1 of the brush roller 217 was 0.79 m/min. The ratio V1/V2 was 0.79.

Out of the electrode 1 wound by the winding roll 103, a part having a length of 4 m was made into a laminated electrode 1 by using a winding machine. The laminated electrode 1 and a current collector for battery were laser-welded. Sputtering of copper did not occur during laser-welding. There was no blowhole observed in the welded area.

In Example 1, the ratio V1/V2 was smaller than 1. Owing to that, the active material layer unformed portion 7 was sufficiently cleaned and the tab portion was excellently welded.

In the present example, the respective examples and Comparative Example 1 to be described later, determinations were made as follows on whether the cleaning was sufficiently performed or not. Tabs before welding were visually checked. When any solid components derived from the dope solution were not observed, it was determined that the cleaning was sufficiently performed. When a solid component derived from the dope solution was observed, it was determined that the cleaning was not sufficiently performed.

Example 2

Basically, procedures similar to those in Example 1 were performed. However, the peripheral speed V1 of the brush roller 217 was 1.0 m/min. The ratio V1/V2 was 1. The active material layer unformed portion 7 was cleaned. However, a certain amount of sputtering of copper occurred during laser-welding. There were blowholes observed in a part of the welded area.

In Example 2, the ratio V1/V2 was 1. Owing to that, the active material layer unformed portion 7 in Example 1 was cleaned more sufficiently than Example 2.

Example 3

Basically, procedures similar to those in Example 1 were performed. However, the peripheral speed V1 of the brush roller 217 was 1.18 m/min. The ratio V1/V2 was 1.18. Sputtering of copper did not occur during laser-welding. There was no blowhole observed in the welded area.

In Example 3, the ratio V1/V2 was greater than 1. Owing to that, the active material layer unformed portion 7 was sufficiently cleaned, and the tab portion was excellently welded.

Example 4

Basically, procedures similar to those in Example 1 were performed. However, the peripheral speed V1 of the brush roller 217 was 1.57 m/min. The ratio V1/V2 was 1.57. Sputtering of copper did not occur during laser-welding. There was no blowhole observed at the welded area.

In Example 4, the ratio V1/V2 was greater than 1. Owing to that, the active material layer unformed portion 7 was sufficiently cleaned, and the tab portion was excellently welded.

Example 5

Basically, procedures similar to those in Example 1 were performed. However, the peripheral speed V1 of the brush roller 217 was 2.36 m/min. The ratio V1/V2 was 2.36. The active material layer unformed portion 7 was cleaned. However, the electrode 1 was wrinkled because the brush rollers 217 easily bit into each other, resulting in deviation of the active material layer unformed portion 7 from the right position. This caused an unsteady conveyance of the electrode 1. Consequently, the active material layer unformed portion 7 in Example 1 was cleaned more sufficiently than that in Example 5.

Example 6

Basically, procedures similar to those in Example 1 were performed. However, the peripheral speed V1 of the brush roller 217 was 4.71 m/min. The conveying speed V2 of the electrode 1 was 3.0 m/min. The ratio V1/V2 was 1.57. Sputtering of copper did not occur during laser-welding. There was no blowhole observed in the welded area.

In Example 6, although the conveying speed V2 was high, the ratio V1/V2 was set within an appropriate range, whereby the active material layer unformed portion 7 was sufficiently cleaned and the tab portion was excellently welded.

Example 7

Basically, procedures similar to those in Example 1 were performed. However, the peripheral speed V1 of the brush roller 217 was −0.39 m/min. The conveying speed V2 of the electrode 1 was 1.0 m/min. The ratio V1/V2 was −0.39.

The active material layer unformed portion 7 was cleaned. However, the electrode 1 was wrinkled because the brush rollers 217 easily bit into each other, resulting in deviation of the active material layer unformed portion 7 from the right position. This caused an unsteady conveyance of the electrode 1. Consequently, the active material layer unformed portion 7 in Example 1 was cleaned more sufficiently than that in Example 7.

Example 8

Basically, procedures similar to those in Example 4 were performed. However, a brush roller with a wire diameter of 0.3 mm was used as the brush roller 217. The ratio V1/V2 was 1.57. The active material layer unformed portion 7 was cleaned. However, a certain amount of sputtering of copper occurred during laser-welding. There were blowholes observed in a part of the welded area.

In Example 8, the wire diameter of the brush roller 217 was too large, resulting in a reduction of a contact area between the active material layer unformed portion 7 and the brush roller 217. Consequently, the active material layer unformed portion 7 was cleaned sufficiently and the tab portion was welded excellently in Example 1 compared to those in Example 8.

Example 9

Basically, procedures similar to those in Example 4 were performed. However, a brush roller whose material was goat hair was used as the brush roller 217. A hardness of the brush roller specified by JIS S 3016-1995 was 10 N/cm$^2$. The ratio V1/V2 was 1.57. Sputtering of copper did not occur during laser-welding. There was no blowhole observed in the welded area.

In Example 9, the brush roller 217 of an appropriate material was used. Thus, the active material layer unformed portion 7 was sufficiently cleaned, and the tab portion was excellently welded.

Example 10

Basically, procedures similar to those in Example 4 were performed. However, a brush roller whose material was goat hair was used as the brush roller 217. The peripheral speed V1 of the brush roller 217 was −0.39 m/min. The ratio V1/V2 was −0.39.

The active material layer unformed portion 7 was cleaned. However, the electrode 1 was wrinkled because the brush rollers 217 easily bit into each other, resulting in deviation of the active material layer unformed portion 7 from the right position. This caused an unsteady conveyance of the electrode 1. Consequently, the active material layer unformed portion 7 in Example 1 was cleaned more sufficiently than that in Example 9.

In Example 10, even though the brush roller 217 was made from a soft natural material, when a direction of V1 is opposite to a direction of V2, the brush rollers 217 easily bit into each other.

Example 11

Basically, procedures similar to those in Example 10 were performed. However, the tab cleaner 117 comprising the cleaning roller units 201, 203 shown in FIG. 10 was used. The ratio V1/V2 was −0.39.

The brush rollers 217 did not bite into each other, and the current collector 3 was not broken. Sputtering of copper did not occur during laser-welding. There was no blowhole observed in the welded area.

In Example 11, the position of the brush roller 217 was fixed, and a distance between the brush roller 217 and the electrode 1 was kept constant. By keeping the distance between the brush roller 217 and the electrode 1 constant, the electrode 1 was not broken, the active material layer unformed portion 7 was sufficiently cleaned, and the tab portion was welded excellently, even when the direction of V1 was opposite to the direction of V2.

Example 12

Basically, procedures similar to those in Example 11 were performed. However, the peripheral speed V1 of the brush roller 217 was 1.57 m/min. The ratio V1/V2 was −1.57. Sputtering of copper did not occur during laser-welding. There was no blowhole observed in the welded area.

In Example 12, the position of the brush roller 217 was fixed, and a distance between the brush roller 217 and the electrode 1 was kept constant. By keeping the distance between the brush roller 217 and the electrode 1 constant, the electrode 1 was not broken, the active material layer unformed portion 7 was sufficiently cleaned, and the tab portion was excellently welded, even when the brush roller 217 was rotating at a high speed and the direction of V1 was opposite to the direction of V2.

Example 13

Basically, procedures similar to those in Example 4 were performed. However, a sponge roller whose material is olefinic sponge was used instead of the brush roller 217 used in Example 4. A hardness of the sponge roller as measured with a type E durometer specified by JIS K 6253-3 was 20. The ratio V1/V2 was 1.57.

The current collector 3 was not broken. Sputtering of copper did not occur during laser-welding. There was no blowhole observed in the welded area.

In Example 13, the cleaning roller was a sponge roller. Even with the sponge roller, the active material layer unformed portion 7 was sufficiently cleaned, and the tab portion was excellently welded.

Comparative Example 1

Basically, procedures similar to those in Examples 1 to 5, and 7 to 13 were performed. However, the tab cleaner 117 was not used. A large amount of sputtering of copper occurred during laser-welding. Some blowholes were observed in the welded area. When the tab cleaner 117 was not used, a defect occurred in the laser-welding.

The invention claimed is:

1. An electrode manufacturing system, comprising:
a doping unit comprising an electrolyte solution treatment bath, at least one doping bath configured to perform a process of doping an active material in a strip-shaped electrode with an alkali metal, and a cleaning bath, the strip-shaped electrode comprising an active material layer formed portion in which an active material layer comprising the active material is formed on a surface of a current collector, and an active material layer unformed portion in which the active material layer is not formed on the surface of the current collector;
a cleaning unit configured to clean the active material layer unformed portion that is adjacent to the active material layer formed portion having been subjected to the process; and
a conveyor configured to convey the electrode from the doping unit to the cleaning unit,
wherein the cleaning unit comprises at least a pair of tab cleaning rollers that comes into contact with the active material layer unformed portion and that does not come into contact with the active material layer formed portion, the at least a pair of tab cleaning rollers being rotated in directions opposite to each other, and
wherein a ratio V1/V2 that is a ratio of a peripheral speed V1 (m/min) of the at least a pair of tab cleaning rollers to a conveying speed V2 (m/min) of the electrode is in a range of −5.0 to 0.99 or in a range of 1.01 to 5.0.

2. The electrode manufacturing system according to claim 1,
wherein the conveyor is configured to continuously convey the electrode from the doping unit including the cleaning bath to the cleaning unit.

3. The electrode manufacturing system according to claim 1,
wherein each of the at least a pair of tab cleaning rollers is a brush roller.

4. The electrode manufacturing system according to claim 1,
wherein a hardness of the at least a pair of tab cleaning rollers specified by JIS S 3016-1995 is in a range of 1 N/cm$^2$ to 1000 N/cm$^2$.

5. The electrode manufacturing system according to claim 1,
wherein the cleaning unit comprises a tab cleaning unit comprising a pair of tab cleaning tanks configured to store at least a part of each of the at least a pair of tab cleaning rollers and a cleaning liquid.

6. The electrode manufacturing system according to claim 5,
further comprising a cleaning liquid supplier unit that comprises a cleaning liquid tank and a pump and that is configured to supply the cleaning liquid to each tab cleaning tank of the tab cleaning unit,
wherein each tab cleaning tank comprises an overflow pipe to consecutively drain the cleaning liquid used during a tab cleaning process from the tab cleaning tank to a waste liquid tank, thereby suppressing reduction and contamination of the cleaning liquid stored in the tab cleaning tank.

7. The electrode manufacturing system according to claim 1,
wherein the active material layer unformed portion has a strip shape extending along a longitudinal direction of the electrode.

8. An electrode manufacturing system, comprising:
a doping unit comprising an electrolyte solution treatment bath, at least one doping bath configured to perform a process of doping an active material in a strip-shaped electrode with an alkali metal, and a cleaning bath, the strip-shaped electrode comprising an active material layer formed portion in which an active material layer comprising the active material is formed on a surface of a current collector, and an active material layer unformed portion in which the active material layer is not formed on the surface of the current collector;
a cleaning unit for cleaning only the active material layer unformed portion on the surface of the current collector, the cleaning unit being adjacent to an area of the active material layer formed portion having been subjected to a process of doping the active material with the alkali metal, the cleaning unit comprising a tab cleaning unit configured to clean the active material layer unformed portion that is adjacent to the active material layer formed portion having been subjected to the process, the tab cleaning unit comprising at least a pair of tab cleaning rollers that comes into contact with the active material layer unformed portion and that does not come into contact with the active material layer formed portion, at least a pair of tab cleaning tanks each configured to respectively store at least a part of a tab cleaning roller of the at least a pair of tab cleaning rollers and a cleaning liquid, the at least a pair of tab cleaning rollers being rotated in directions opposite to each other, and a ratio V1/V2 that is a ratio of a peripheral speed V1 (m/min) of the at least a pair of tab cleaning rollers to a conveying speed V2 (m/min) of the electrode being in a range of −5.0 to 0.99 or in a range of 1.01 to 5.0;
a conveyor configured to convey the electrode from the doping unit to the cleaning unit; and
a cleaning liquid supplier unit that comprises a cleaning liquid tank and a pump and that is configured to supply the cleaning liquid to each tab cleaning tank of the tab cleaning unit,
wherein
each tab cleaning tank comprises an overflow pipe to consecutively drain the cleaning liquid used during a tab cleaning process from the tab cleaning tank to a waste liquid tank, thereby suppressing reduction and contamination of the cleaning liquid stored in the tab cleaning tank, and
the strip-shaped electrode is conveyed vertically along a path passing through a gap of each pair of the tab cleaning tanks and the cleaning rollers in the tab cleaning unit.

9. A method for manufacturing an electrode with the electrode manufacturing system according to claim 1, the method comprising:
doping an active material in a strip-shaped electrode with an alkali metal, the strip-shaped electrode comprising an active material layer formed portion in which an active material layer comprising the active material is formed on a surface of a current collector, and an active material layer unformed portion in which the active material layer is not formed on the surface of the current collector;
conveying the electrode having been subjected to the doping; and
cleaning the active material layer unformed portion that is adjacent to the active material layer formed portion having been subjected to the doping, using at least a pair of tab cleaning rollers that comes into contact with the active material layer unformed portion and that does not come into contact with the active material layer formed portion, the at least a pair of tab cleaning rollers being, rotated in directions opposite to each other, and a ratio V1/V2 that is a ratio of a peripheral speed V1 (m/min) of the at least a pair of tab cleaning rollers to a conveying speed V2 (m/min) of the electrode being in a range of −5.0 to 0.99 or in a range of 1.01 to 5.0.

10. The electrode manufacturing method according to claim 9,
wherein the electrode that has been subjected to the doping is continuously conveyed.

11. The electrode manufacturing method according to claim 10, wherein the ratio V1/V2 is in a range of 0.1 to 0.9, or in a range of 1.1 to 2.0.

* * * * *